US008622778B2

(12) United States Patent
Tyers et al.

(10) Patent No.: US 8,622,778 B2
(45) Date of Patent: Jan. 7, 2014

(54) PROGRAMMABLE AUTOMATIC DOCKING SYSTEM

(71) Applicants: Maxwell Tyers, Rancho Cucamonga, CA (US); Bradley Tyers, Currambine Western (AU)

(72) Inventors: Maxwell Tyers, Rancho Cucamonga, CA (US); Bradley Tyers, Currambine Western (AU)

( * ) Notice: Subject to any disclaimer, the term of this patent is extended or adjusted under 35 U.S.C. 154(b) by 0 days.

(21) Appl. No.: 13/939,052

(22) Filed: Jul. 10, 2013

(65) Prior Publication Data

US 2013/0297104 A1 Nov. 7, 2013

Related U.S. Application Data

(63) Continuation-in-part of application No. 12/950,990, filed on Nov. 19, 2010, and a continuation-in-part of application No. 13/590,901, filed on Aug. 21, 2012, now abandoned.

(51) Int. Cl.

| | |
|---|---|
| ***B63H 21/22*** | (2006.01) |
| ***B63H 23/00*** | (2006.01) |
| *B63H 25/02* | (2006.01) |
| *G05D 1/02* | (2006.01) |

(52) U.S. Cl.
USPC .......................................... 440/1; 114/144 B

(58) Field of Classification Search
USPC ....... 440/1, 2, 3, 84, 86; 114/144 B; 701/1, 2, 701/21, 200, 300; 342/41
See application file for complete search history.

(56) References Cited

U.S. PATENT DOCUMENTS

| | | | |
|---|---|---|---|
| 3,673,553 | A | 6/1972 | Miura et al. |
| 3,690,767 | A | 9/1972 | Missio et al. |
| 3,707,717 | A | 12/1972 | Frielinghaus |
| 3,754,247 | A | 8/1973 | Hansford |
| 3,772,693 | A | 11/1973 | Allard et al. |
| 4,216,538 | A | 8/1980 | Tomlinson et al. |
| 4,510,496 | A | 4/1985 | Ross |
| 5,274,378 | A | 12/1993 | O'Conner |
| 5,432,515 | A | 7/1995 | O'Conner |
| 5,781,147 | A | 7/1998 | Elliot et al. |
| 6,064,330 | A | 5/2000 | Elliot et al. |
| 6,677,889 | B2 | 1/2004 | Van Rees et al. |
| 6,707,414 | B2 | 3/2004 | Van Rees et al. |
| 6,978,729 | B2 | 12/2005 | Bertetti et al. |
| 6,995,662 | B2 | 2/2006 | Wortsmith |
| 7,021,231 | B2 | 4/2006 | Smart |
| 7,315,274 | B2 | 1/2008 | Fossum |
| 7,389,735 | B2 | 6/2008 | Kaji et al. |
| 7,561,886 | B1 | 7/2009 | Gonring et al. |
| 2008/0033603 | A1 | 2/2008 | Gensler et al. |
| 2008/0289558 | A1 | 11/2008 | Montgomery |

*Primary Examiner* — Daniel V Venne
(74) *Attorney, Agent, or Firm* — Bay State IP, LLC

(57) ABSTRACT

A programmable automatic docking system for a marine vessel, wherein the programmable automatic docking system includes a set of starboard side transducers and a set of port side transducers to detect and transmit real-time distance, position and velocity information of the marine vessel in relation to an external object. A programmable processor control unit receives the real-time distance, position and velocity information to control a set of propulsion elements to automatically control the marine vessels direct path of travel toward an external object and maintain the marine vessel at a pre-selected distance once the pre-selected distance is reached.

14 Claims, 15 Drawing Sheets

AUTOMATICALLY LOCATE VESSEL ADJACENT TO DOCK OR OBJECT
MARINE VESSEL AUTOMATIC DOCKING (MVAD)

AUTOMATIC ACCIDENT AVOIDANCE IN MARINAS AND DOCKING AREAS
MARINE VESSEL AUTOMATIC DOCKING (MVAD)

PARKING VESSEL AUTOMATICALLY IN SLIP AREA
MARINE VESSEL AUTOMATIC DOCKING (MVAD)

AUTOMATIC LOCATION OF FLOATING BOUY/MOORING
MARINE VESSEL AUTOMATIC DOCKING (MVAD)

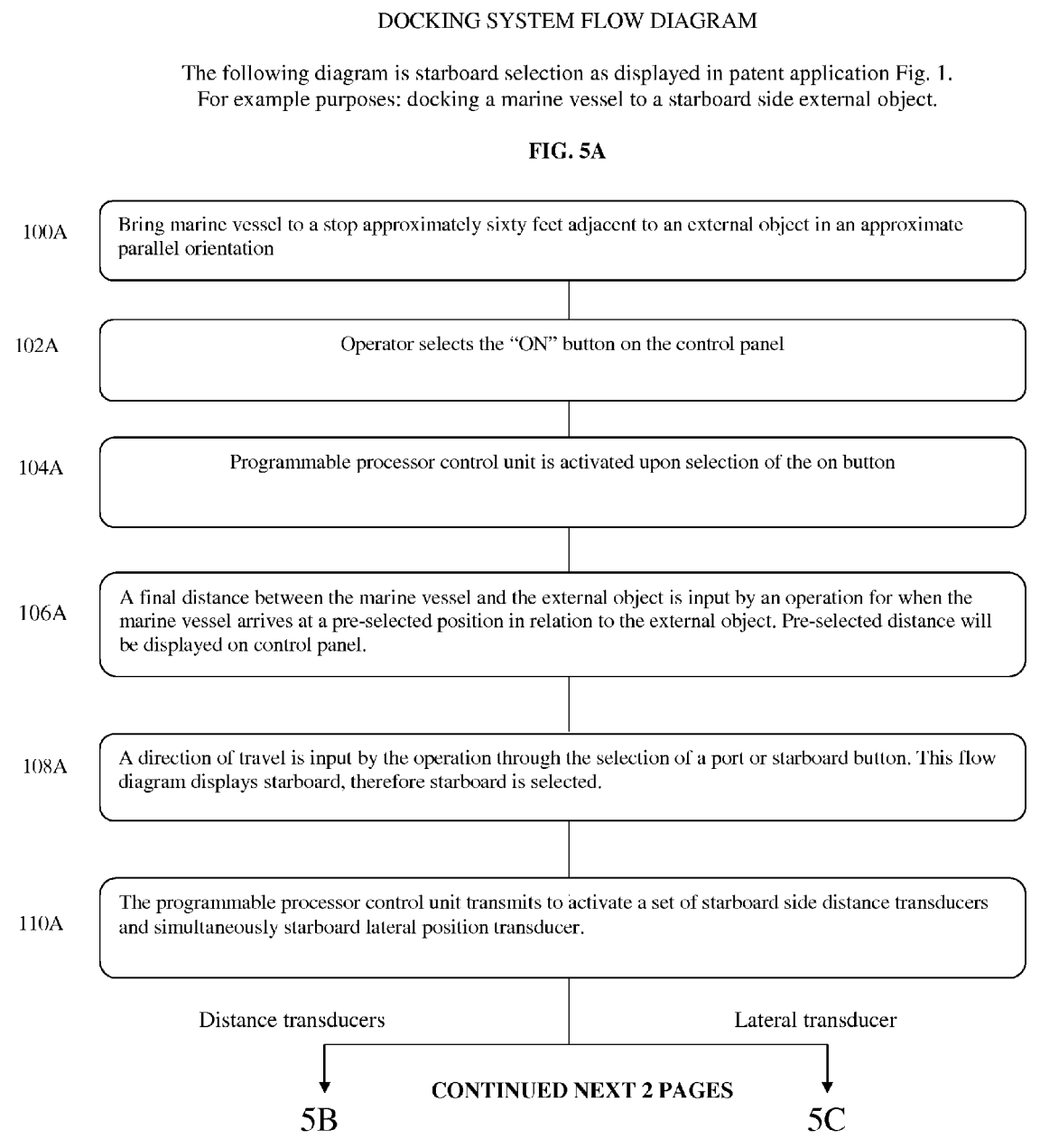

DOCKING SYSTEM FLOW DIAGRAM

The following diagram is starboard selection as displayed in patent application Fig. 1.
For example purposes: docking a marine vessel to a starboard side external object.

FIG. 5A

100A Bring marine vessel to a stop approximately sixty feet adjacent to an external object in an approximate parallel orientation 102A Operator selects the "ON" button on the control panel 104A Programmable processor control unit is activated upon selection of the on button 106A A final distance between the marine vessel and the external object is input by an operation for when the marine vessel arrives at a pre-selected position in relation to the external object. Pre-selected distance will be displayed on control panel.

108A A direction of travel is input by the operation through the selection of a port or starboard button. This flow diagram displays starboard, therefore starboard is selected.

110A The programmable processor control unit transmits to activate a set of starboard side distance transducers and simultaneously starboard lateral position transducer.

Distance transducers → 5B

Lateral transducer → 5C

CONTINUED NEXT 2 PAGES

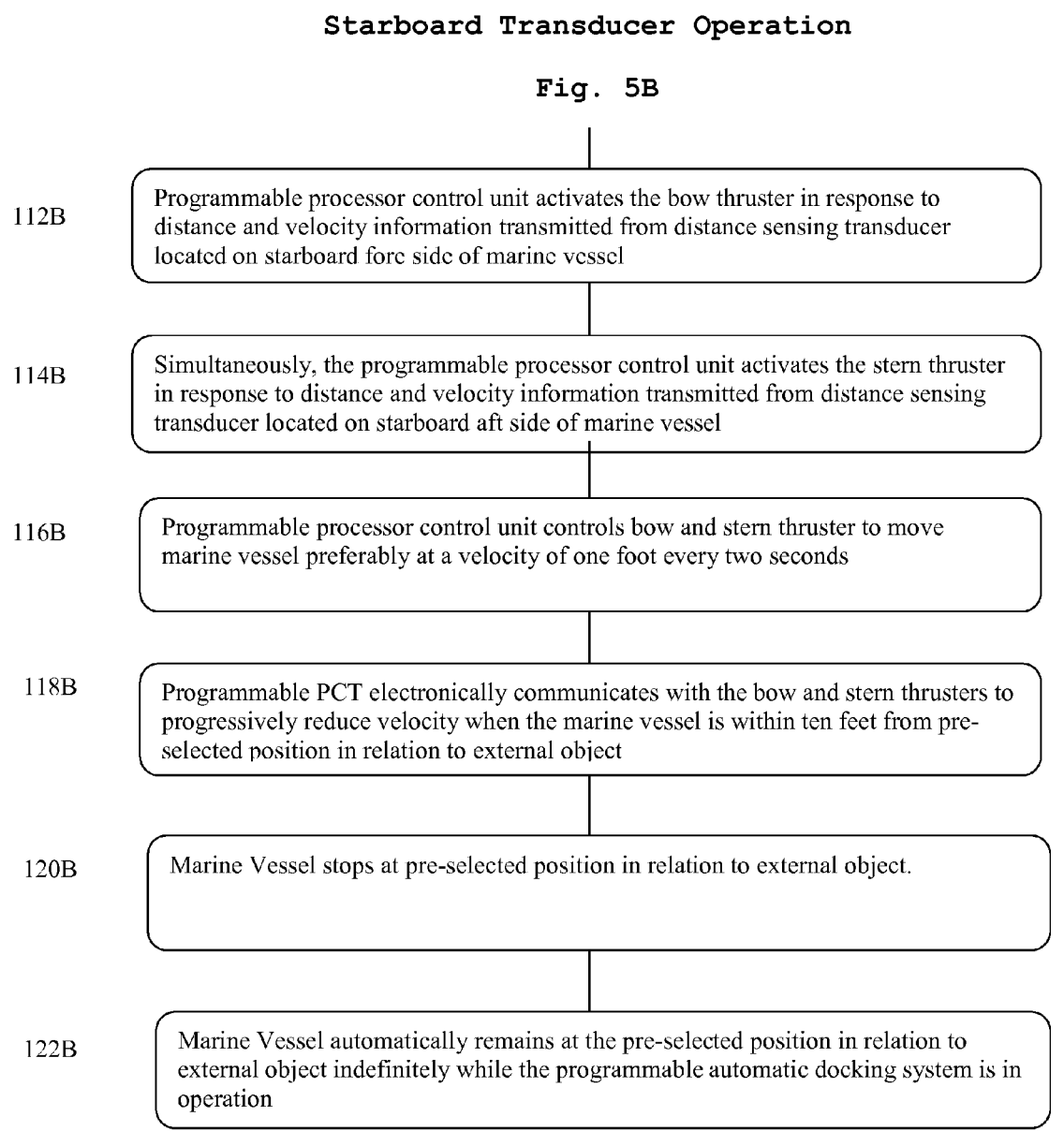

Starboard Transducer Operation

Fig. 5B

112B — Programmable processor control unit activates the bow thruster in response to distance and velocity information transmitted from distance sensing transducer located on starboard fore side of marine vessel 114B — Simultaneously, the programmable processor control unit activates the stern thruster in response to distance and velocity information transmitted from distance sensing transducer located on starboard aft side of marine vessel 116B — Programmable processor control unit controls bow and stern thruster to move marine vessel preferably at a velocity of one foot every two seconds 118B — Programmable PCT electronically communicates with the bow and stern thrusters to progressively reduce velocity when the marine vessel is within ten feet from pre-selected position in relation to external object 120B — Marine Vessel stops at pre-selected position in relation to external object.

122B — Marine Vessel automatically remains at the pre-selected position in relation to external object indefinitely while the programmable automatic docking system is in operation

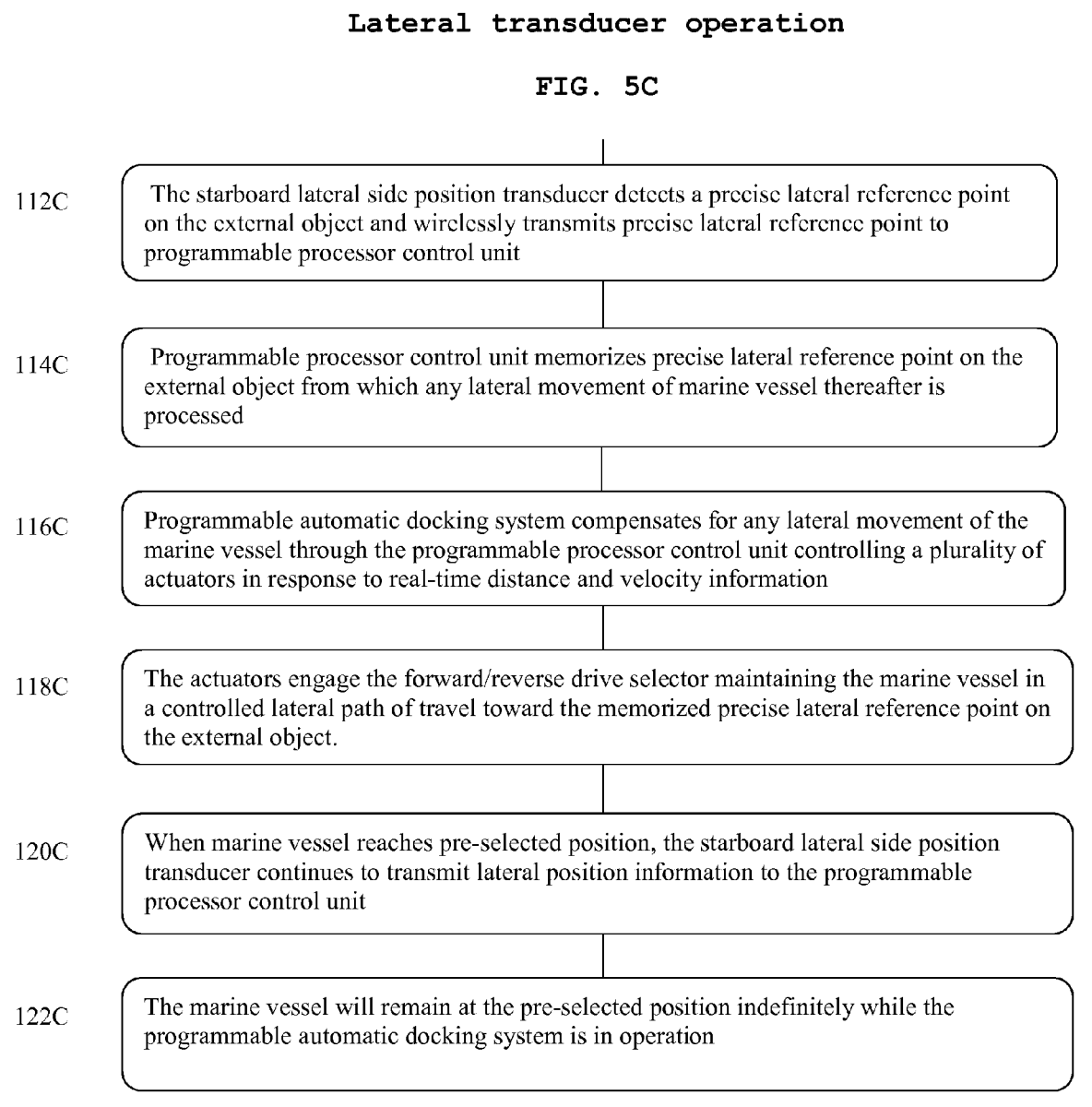

Lateral transducer operation

FIG. 5C

112C The starboard lateral side position transducer detects a precise lateral reference point on the external object and wirelessly transmits precise lateral reference point to programmable processor control unit 114C Programmable processor control unit memorizes precise lateral reference point on the external object from which any lateral movement of marine vessel thereafter is processed 116C Programmable automatic docking system compensates for any lateral movement of the marine vessel through the programmable processor control unit controlling a plurality of actuators in response to real-time distance and velocity information 118C The actuators engage the forward/reverse drive selector maintaining the marine vessel in a controlled lateral path of travel toward the memorized precise lateral reference point on the external object.

120C When marine vessel reaches pre-selected position, the starboard lateral side position transducer continues to transmit lateral position information to the programmable processor control unit 122C The marine vessel will remain at the pre-selected position indefinitely while the programmable automatic docking system is in operation

AUTOMATIC COLLISION AVOIDANCE

Docking System Flow Diagram FIG.7A
Automatic Maneuvering a Marine Vessel into a Slip
Flow diagram for example demonstrates forward movement with starboard selection
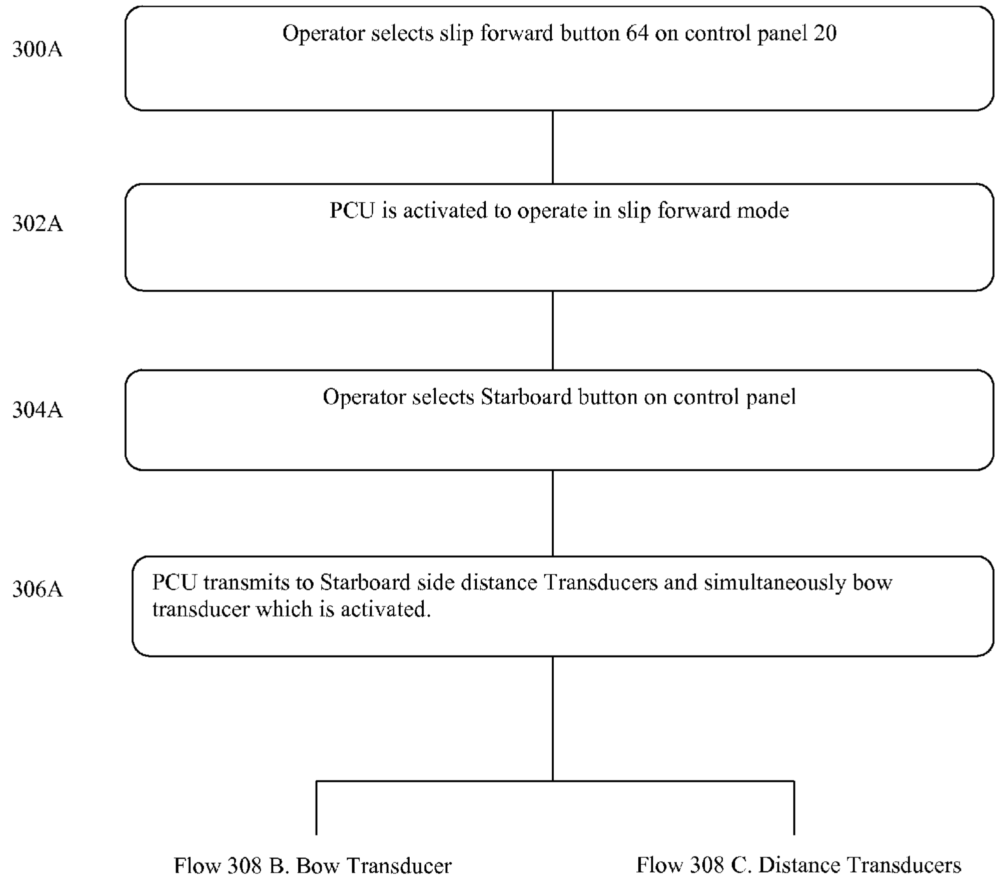

Flow Diagram FIG.7 B
Automatic maneuvering of a Marine vessel into a slip
Bow Transducer Operation
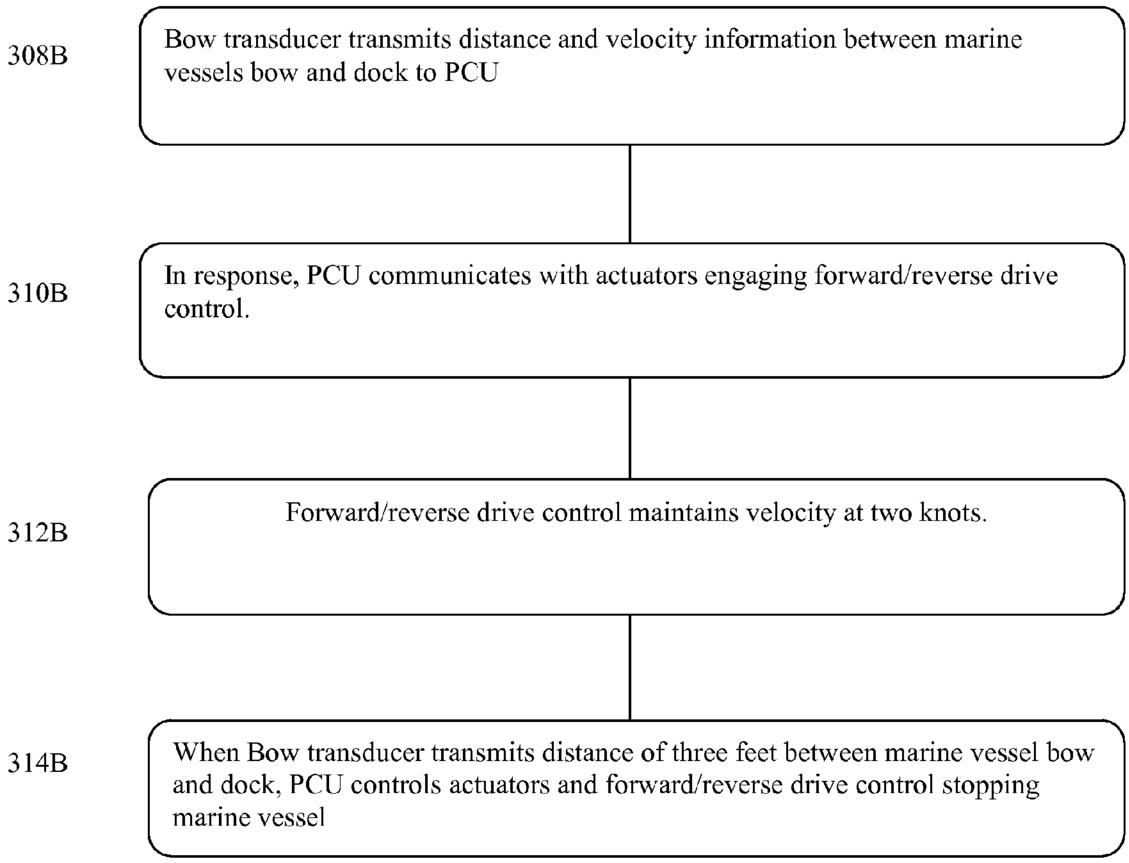

Docking System Flow Diagram FIG.7 C
Automatic Maneuvering a Marine Vessel into a Slip
Distance Transducer Operation
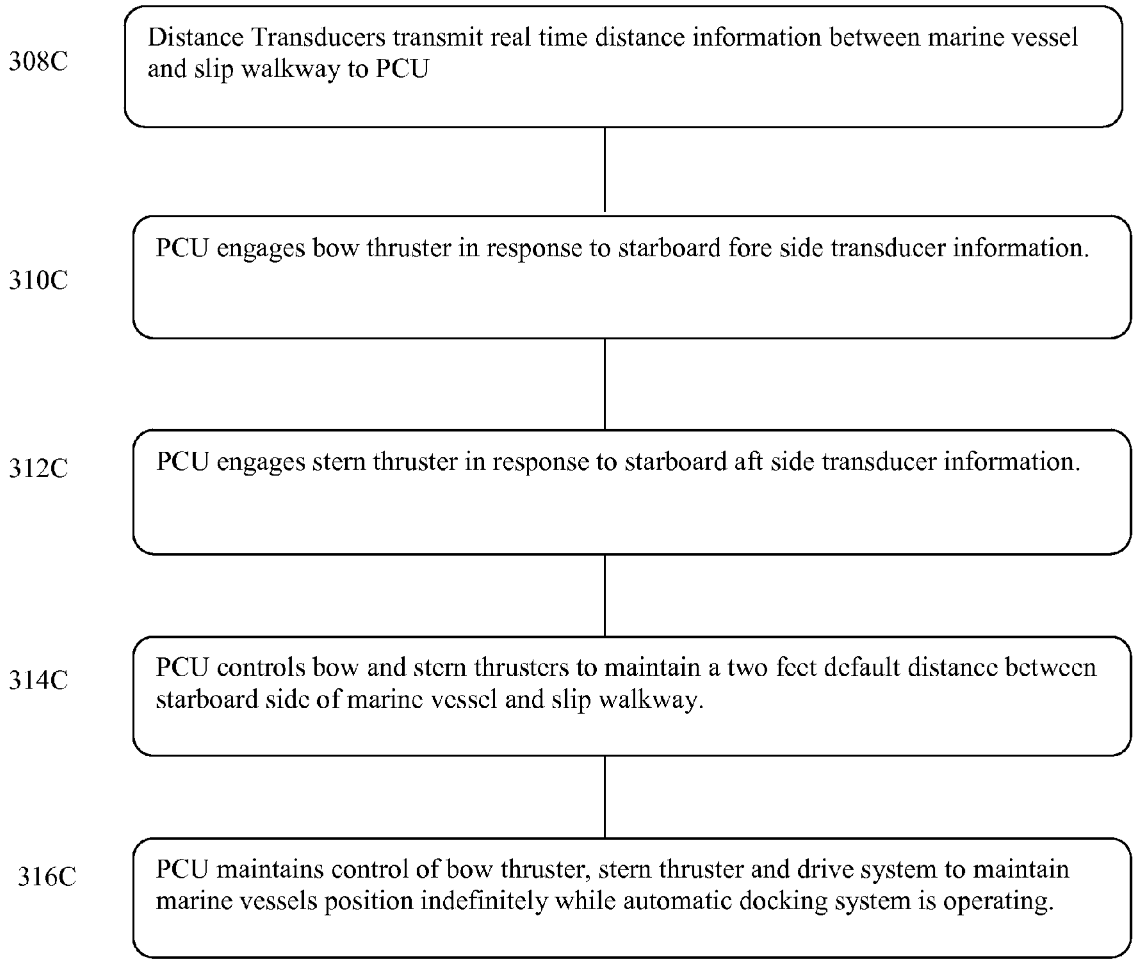

FLOATING BUOY/MOORING OPERATION Fig.8
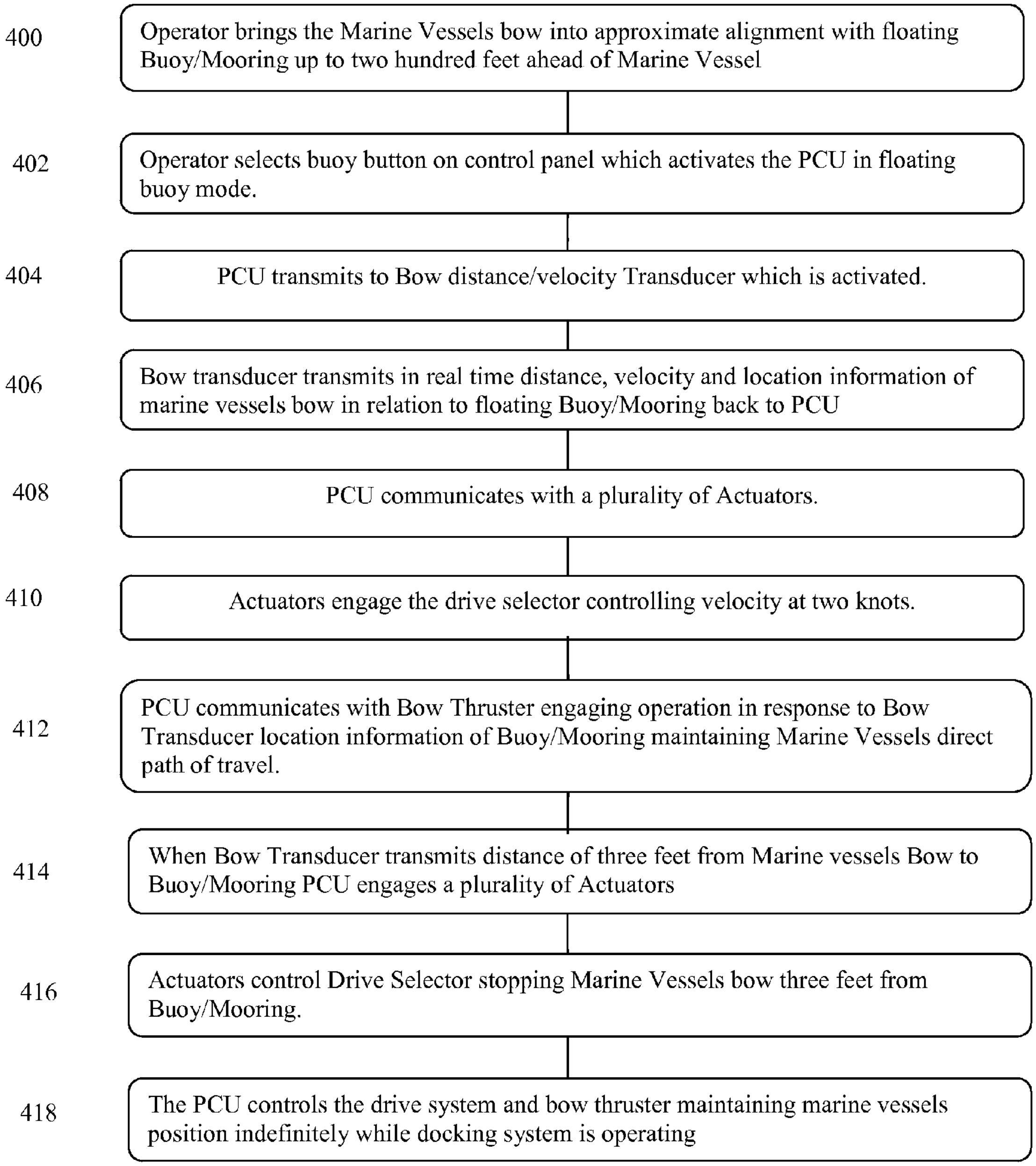

DOCKING DEPARTURE SYSTEM FLOW DRAWING Fig. 9A
For this example we will select operation for departure from a starboard side external object
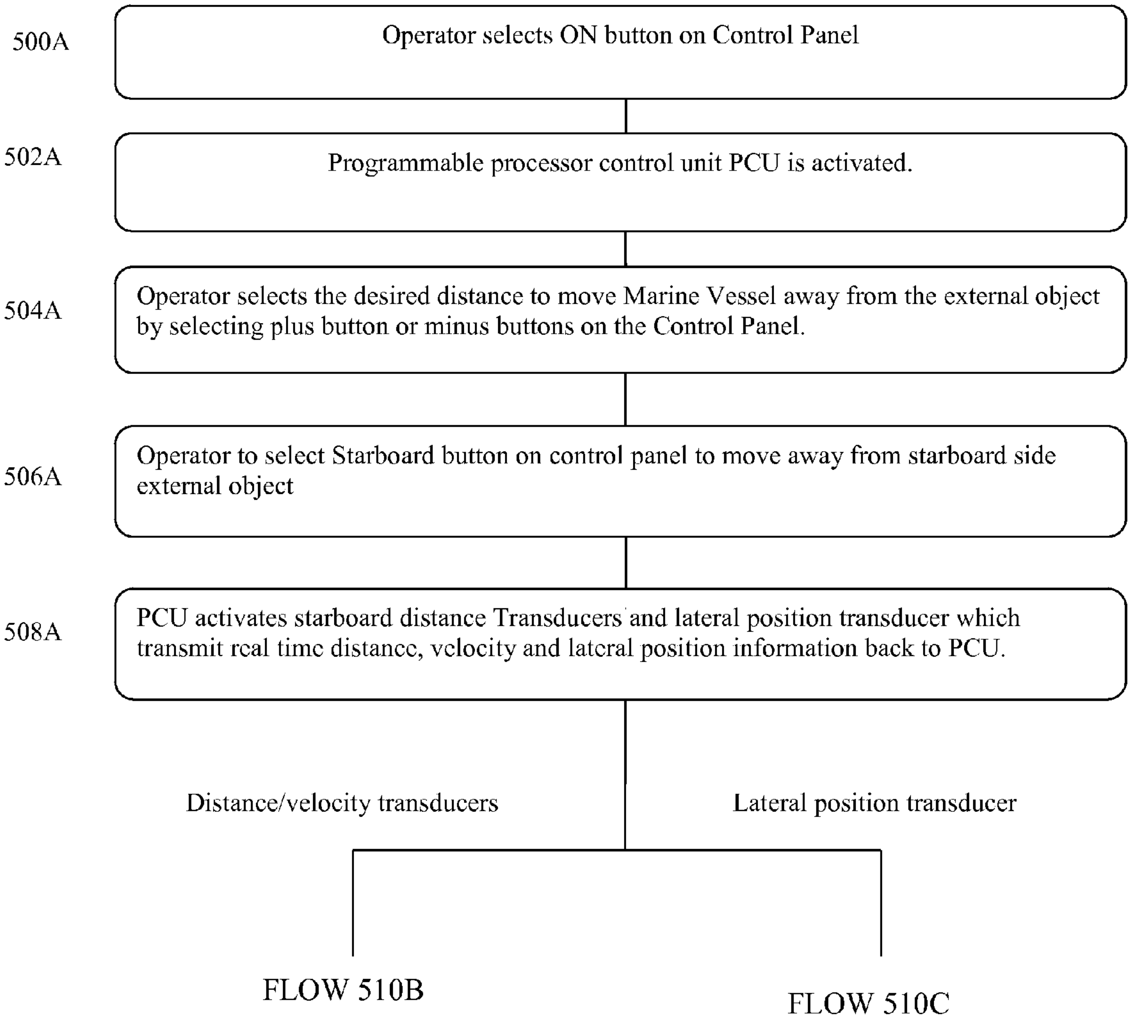
CONTINUED ON PAGE 2

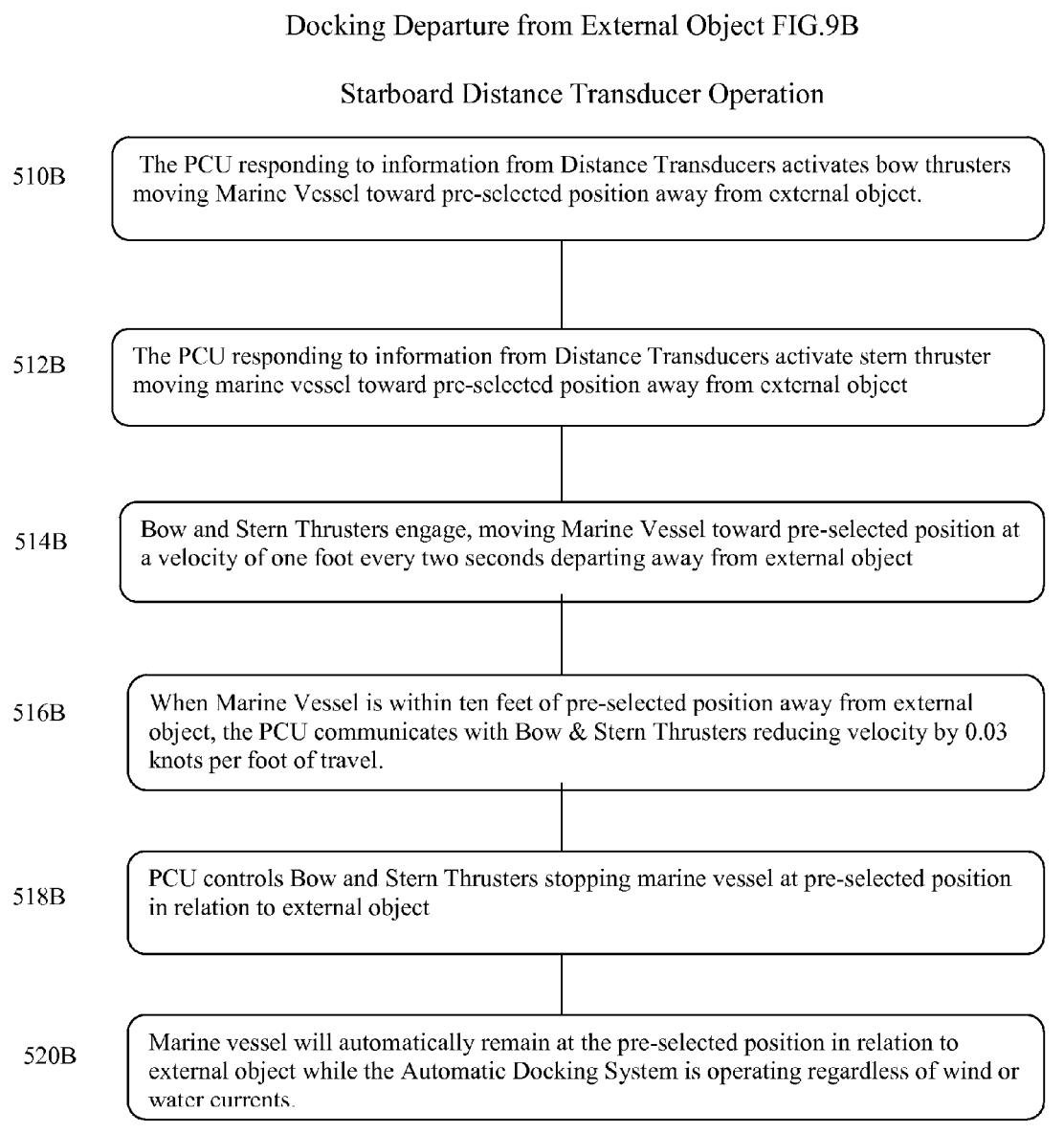

Docking Departure from External Object FIG.9B

Starboard Distance Transducer Operation

510B The PCU responding to information from Distance Transducers activates bow thrusters moving Marine Vessel toward pre-selected position away from external object.

512B The PCU responding to information from Distance Transducers activate stern thruster moving marine vessel toward pre-selected position away from external object 514B Bow and Stern Thrusters engage, moving Marine Vessel toward pre-selected position at a velocity of one foot every two seconds departing away from external object 516B When Marine Vessel is within ten feet of pre-selected position away from external object, the PCU communicates with Bow & Stern Thrusters reducing velocity by 0.03 knots per foot of travel.

518B PCU controls Bow and Stern Thrusters stopping marine vessel at pre-selected position in relation to external object 520B Marine vessel will automatically remain at the pre-selected position in relation to external object while the Automatic Docking System is operating regardless of wind or water currents.

DOCKING SYSTEM DEPARTURE FROM EXTERNAL OBJECT
Following example: marine vessel departing starboard external object.
Fig.9C flow diagram
Lateral position transducer operation
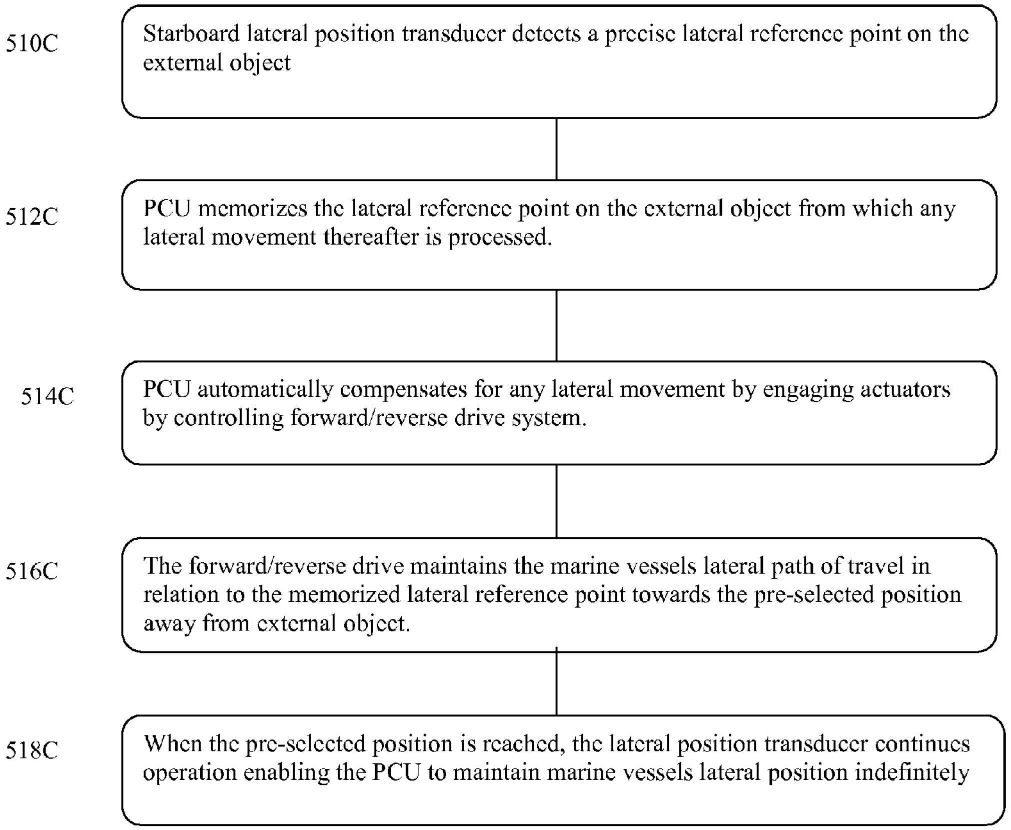

PROGRAMMABLE AUTOMATIC DOCKING SYSTEM

CROSS-REFERENCE TO RELATED APPLICATIONS

This application is a continuation-in-part application and claims priority to and takes the benefit of U.S. patent application Ser. No. 13/590,901 filed on Aug. 21, 2012 and U.S. patent application Ser. No. 12/950,990 filed on Nov. 19, 2010, the contents of which are hereby incorporated by reference.

BACKGROUND OF THE INVENTION

1. Field of the Invention

The instant invention relates generally to automatic docking and marine vessel collision avoidance systems preferably for a marine vessel, and more particularly to a programmable automatic docking system incorporating a plurality of transducers to detect and transmit a set of distance information between the marine vessel and an external object (i.e. a dock, another marine vessel, a structure above water, or buoy for example) to enable the programmable automatic docking system to navigate the marine vessel to a final pre-selected position from the external object and maintain that position.

2. Description of the Related Prior Art

Docking operations of large marine vessels is a precision operation which may cause damage to the marine vessel and the dock when relying on the skill and judgment of an operator. Maintaining the final position of the marine vessel requires the aid of multiple ropes and fenders. Dangerous weather conditions such as wind, water currents and darkness, increase the risk associated with the docking operation.

Previous docking systems have required additional aids to assist in measuring the effects of these variables in order to provide visual aids to assist a skilled operator to manually dock the marine vessel. The docking operation requires a skilled pilot and many deck hands to assist with docking. Furthermore, the larger a marine vessel, the greater the risk that exists during docking operations thereby resulting in a greater need for the application of skill and extra deck hands.

SUMMARY OF THE INVENTION

The instant system and method, as illustrated herein, is clearly not anticipated, rendered obvious, or even present in any of the prior art mechanisms, either alone or in any combination thereof. Thus the several embodiments of the instant apparatus are illustrated herein.

The primary object of the instant invention is to provide a programmable automatic docking system, wherein the programmable automatic docking system includes a programmable processor control unit ("PCU") primarily for automatically docking and navigating a marine vessel to a final position in relation to an external object, including, but not limited to a dock. Furthermore, the programmable automatic docking system operates independently and without the use or requirement of any human operators upon initiation of the programmable automatic docking system.

Another object of the instant invention is to provide a programmable automatic docking system that possesses the capability to operate effectively in adverse weather conditions without the requirement or need for human operators to carryout docking operations.

Another object of the instant invention is to provide a programmable automatic docking system that removes the risk of damage to the marine vessel and/or the external object by enabling the marine vessel to automatically move sideways towards the external object upon initiation of the programmable automatic docking system and to a maintain a pre-selected position from the external object.

Another object of the instant invention is to provide a programmable automatic docking system which comprises a plurality of transducers to detect and transmit a set of distance information between the marine vessel and an external object.

Another object of the instant invention is to provide a programmable automatic docking system, wherein the set of distance information provides feedback to the processor control unit to enable a plurality of thrusters in conjunction with a main drive system on the marine vessel, to drive the marine vessel in a sideways, fore and aft direction toward the external object in a controlled lateral path, and velocity.

Another object of the instant invention is to provide a programmable automatic docking system that maintains the location of the marine vessel once the marine vessel has reached a pre-selected position relative to the external object and to maintain that position indefinitely regardless of the wind and water currents while the system is in operation.

Another object of the instant invention is to provide a programmable automatic docking system that automatically position's a marine vessel into a slip location regardless of wind and water currents.

Another object of the instant invention is to provide a programmable automatic docking system that maintains the pre-selected position of the marine vessel without the aid of multiple ropes and fenders indefinitely while the programmable automatic docking system is in operation.

Yet another object of the instant invention is to provide a programmable automatic docking system that includes a programmable processor control unit to enable the marine vessel to remain at a pre-selected distance alongside an external object.

Yet another object of the instant invention is to provide a programmable automatic docking system that includes a programmable processor control unit to enable efficient operation regardless of the length of the marine vessel.

In brief, the programmable automatic docking system, once engaged, operates completely automatic without human operators, by controlling the precise movement and location of a marine vessel in relation to an external object until the marine vessel reaches a final pre-selected position, and then maintains the final position of the marine vessel while the programmable automatic docking system is in operation regardless of wind and water currents.

There has thus been outlined, rather broadly, one of the features of an automatic docking system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways, including applications involving other forms of moving vehicles. Also, it is to be understood that the phraseology and terminology employed herein are for the purpose of description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE SEVERAL VIEWS OF THE DRAWINGS

These and other details of the present invention will be described in connection with the accompanying drawings, which are furnished only by way of illustration and not in limitation of the invention, and in which drawings:

FIGS. 5A-5C is a set of flow diagrams illustrating one embodiment of the method of operation of the programmable automatic docking system during docking operations of a marine vessel with an external object.

FIGS. 7A-7C is a set of flow diagrams illustrating one embodiment of the method of operation of the programmable automatic docking system during docking operations of a marine vessel upon entering into a slip.

FIG. 8 is a flow diagram illustrating one embodiment of the method of operation of the programmable automatic docking system during the automatic location of a buoy and/or mooring for a marine vessel.

FIGS. 9A-9C is a set of flow diagrams illustrating one embodiment of the method of operation of the programmable automatic docking system during a marine vessel's departure and undocking from an external object.

DETAILED DESCRIPTION OF THE PREFERRED EMBODIMENTS

For explanatory purposes only, this section refers to a marine vessel and an external object when describing both a marine vessel's port and starboard operations. Furthermore, the only difference in operation between "port" or "starboard" operation is the selection of a "port" or "starboard" button on a control panel. This selection determines the activation of a set of "port" or "starboard" transducers and "port" or "starboard" direction of the marine vessel's sideways movement. Lastly, FIGS. 1-4 illustrate in detail the starboard side of a marine vessel for illustrative purposes only; however one of skill in the art may easily understand the operation from a port side of the marine vessel.

Figure 1:
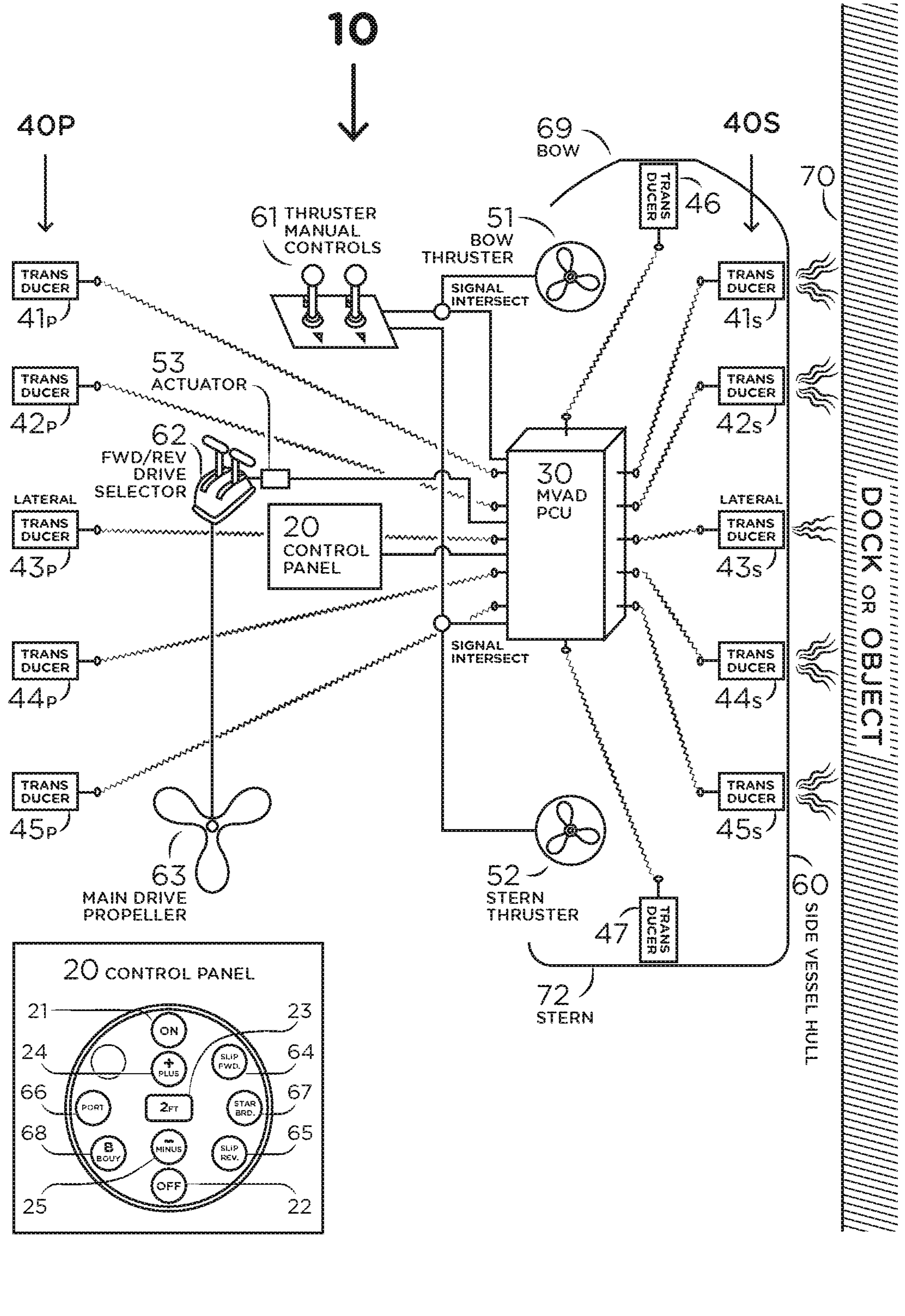
FIG. 1 is a diagrammatic perspective view of a programmable automatic docking system, wherein the system includes a plurality of port and starboard transducers, along with a pair of lateral position transducers on a marine vessel, and a programmable control panel to initiate a variety of automatic functions through a processor control unit designed to execute the selected automatic functions.

FIG. 1 illustrates a diagrammatic perspective view of a programmable automatic docking system 10 possessing an integrated interactive proximity sensing feedback of a marine vessel's 60 direction, lateral position, and velocity, along with automatic control of the docking operations and other associated functions for the marine vessel 60 once the programmable automatic docking system 10 is engaged.

In one embodiment, the programmable automatic docking system 10 comprises a set of port side transducers 40P and a set of starboard side transducers 40S. Preferably the set of port side transducers 40P further comprises four distance sensing transducers 41P, 42P, 44P and 45P, and one lateral port side position transducer 43P, and the set of starboard side transducers 40S further comprises four distance sensing transducers 41S, 42S, 44S and 45S, and one lateral starboard side position transducer 43S. In one embodiment, the set of port side transducers 40P and the set of starboard side transducers 40S provide distance, velocity, and position information between five spaced locations on the port and starboard sides of the marine vessel 60.

In yet another embodiment of the programmable automatic docking system 10, the set of port side transducers 40P comprise a pair of distance sensing transducers 41P and 42P located on the port fore side of the marine vessel 60, and a pair of distance sensing transducers 44P and 45P located on the port aft side of the marine vessel 60, wherein each port side transducer 41P, 42P, 44P and 45P detects and transmits a set of distance and velocity information relating to the distance between the port side of the marine vessel 60 and an external object 70; in one embodiment, the external object 70, includes, but is not limited to a dock, another marine vessel, or other similar structure. Additionally, the lateral port side position transducer 43P establishes a lateral position from the port side of the marine vessel 60 in relation to a precise lateral reference point on the port external object 70. In this embodiment, the precise lateral reference point detected is a random reference point located at ninety degrees to the side of the marine vessel 60 on the external object 70; it may also transmit any lateral movement of the marine vessel 60 to a programmable processor control unit 30 (see below discussion).

In yet another embodiment of the programmable automatic docking system 10, the set of starboard side transducers 40S comprise a pair of distance sensing transducers 41S and 42S located on the starboard fore side of the marine vessel 60, and a pair of distance sensing transducers 44S and 45S located on the starboard aft side of the marine vessel 60, wherein each starboard side transducer 41S, 42S, 44S and 45S detect and transmit a set of distance and velocity information relating to the distance between the starboard side of the marine vessel 60 and an external object 70; in one embodiment, the external object 70, includes, but is not limited to a dock, or other similar structure. Additionally, the lateral starboard side position transducer 43S establishes a lateral position from the starboard side of the marine vessel 60 in relation to a precise lateral reference point on the starboard external object 70.

The programmable automatic docking system 10 further comprises a propulsion system which includes a bow thruster 51 and a stern thruster 52, wherein each respective thruster 51, and 52 drives the marine vessel 60 in a sideways direction in relation to the orientation of the external object 70, thereby aligning and subsequently maintaining the side of the marine vessel 60 at a final pre-selected distance from the external object 70. Moreover, the propulsion system further includes a forward/reverse drive selector 62, and a main drive propeller 63 that works in conjunction with the bow thruster 51 and stern thruster 52.

Additionally, the programmable automatic docking system 10 includes a programmable processor control unit ("PCU") 30 which further comprises an automatic processor operating in real time to communicate and transmit the set of distance and velocity information provided by the set of port side transducers 40P and starboard side transducers 40S and the propulsion system, wherein each element of the propulsion system may operate independently or together as determined by the programmable processor control unit 30.

In one embodiment the set of port side transducers 40P are preferably used to transmit distance, position and velocity information with respect to the port side of the marine vessel 60 in relation to the port side external object 70 to the programmable processor control unit 30. The set of starboard side transducers 40S are preferably used to transmit distance, position and velocity information with respect to the starboard side of the marine vessel 60 in relation to the starboard side external object 70 to the programmable processor control unit 30.

Additionally, the programmable automatic docking system 10 comprises a control panel 20, wherein the control panel 20 allows for the execution of a series of defined functions by the programmable automatic docking system 10 through the selection of a specific input. In one embodiment, the control panel 20 includes an on button 21 to activate the programmable automatic docking system 10 and an off button 22 to deactivate the programmable automatic docking system 10. Furthermore, the control panel 20 comprises a port button 66 and a starboard button 67, wherein in one embodiment, when the port button 66 is selected on the control panel 20, the set of port side transducers 40P wirelessly transmit the set of distance, position and velocity information which includes real-time distance, position and velocity measurements of the port side of the marine vessel 60 in relation to the external object 70 to the programmable processor control unit 30. Upon receiving the set of distance and velocity information, the programmable processor control unit 30 engages the bow thruster 51 in response to the real-time distance and velocity information provided by the set of port fore side transducers 41P and 42P during docking operations.

In yet another embodiment, a distance setting may be entered relating to a final pre-selected distance between the marine vessel 60 and the external object 70 by selecting a plus button 24 or minus button 25 on the control panel 20. The final pre-selected distance setting is then transmitted to the programmable processor control unit 30 for use once the programmable automatic docking system 10 is in operation. As stated above, the system may be engaged by selecting the "on" button 21 on the control panel 20 and disengaged by selecting the "off" button 22 on the control panel 20.

In one embodiment, when the port button 66 is selected on the control panel, the set of port side transducers 40P wirelessly transmits the set of position information which includes real-time distance and velocity measurements of the port side hull of the marine vessel 60 in relation to the external object 70 to the programmable processor control unit 30. Upon receiving the set of position information, the programmable processor control unit 30 engages the bow thruster 51 and stern thruster 52 in response to real-time distance transducers distance and velocity information provided by the set of port side transducers 41P 42P 44P and 45P during docking operations.

Furthermore, the lateral starboard side position transducer 43S and the lateral port side position transducer 43P are located approximately midship on the starboard side and port side respectively, to sense a precise lateral reference point on the external object 70. Each lateral position transducer 43P and 43S is able to sense, detect and wirelessly transmit real time lateral reference point information to the programmable processor control unit 30, which is memorized and utilized during any lateral movement of the marine vessel 60 thereafter for orientation of the marine vessel 60. Additionally, the programmable processor control unit 30 automatically compensates for any fore or aft lateral movement of the marine vessel 60 by controlling a plurality of actuators 53 which engage a main drive 62 to maintain the marine vessel 60 in a controlled lateral path toward the memorized precise lateral reference point on the external object 70.

In yet another embodiment, the programmable processor control unit 30 is in electronic communication with and automatically controls the bow thruster 51 and the stern thruster 52 to position the side of the marine vessel 60 adjacent to the external object 70 at a pre-selected distance from the external object 70 and to maintain the side of the marine vessel 60 at the pre-selected distance automatically, thereby providing a completely programmable automatic docking system 10 of integrated interactive proximity obtaining feedback and automatic control of marine vessel positioning which requires no operator after setting the system in operation.

Figure 2:
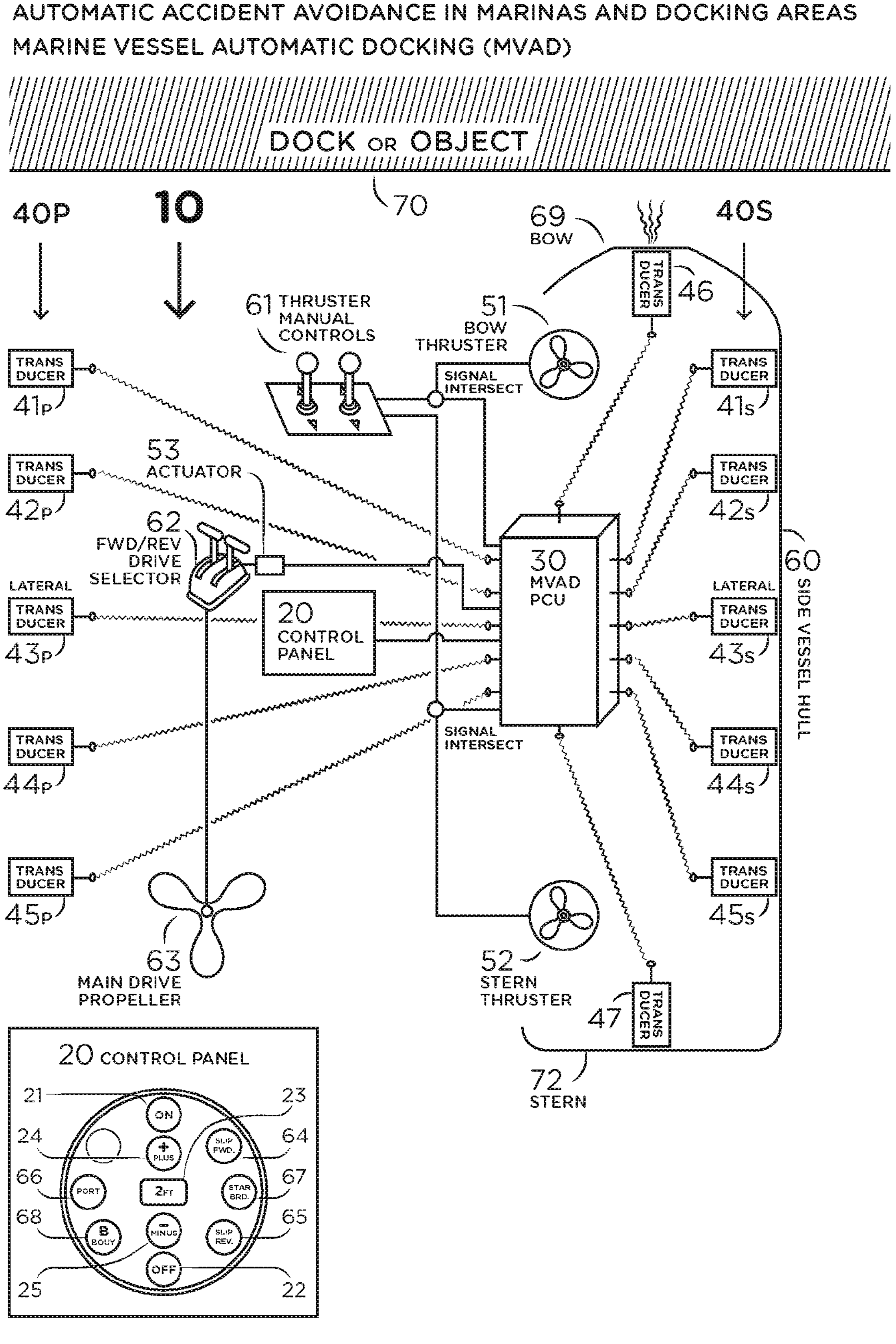
FIG. 2 is a diagrammatic perspective view of one embodiment of the programmable automatic docking system in use during collision avoidance operations.

FIG. 2 illustrates an automatic collision avoidance function of the instant invention preferably in marinas and other similar docking areas. In this embodiment, when a forward/reverse drive selector 62 is in operation, the "ON" button 21 is selected on the control panel 20, and the selection is electronically communicated to the programmable processor control unit 30. Following the activation of the programmable automatic docking system 10, by the selection of the on button 21, the programmable processor control unit 30 transmits to activate a bow distance, velocity and position transducer 46. Upon activation of the bow distance, velocity and position transducer 46, real-time distance and velocity information is detected and wirelessly transmitting to the programmable processor control unit 30 distance and velocity information of the bow 69 of the marine vessel 60 in relation to an external object 70 (i.e. an environment such as a marina, another marine vessel or rocks etc.). In this embodiment, the programmable processor control unit 30 is in electronic communication with a plurality of actuators 53 which control the forward/reverse drive selector 62 to maintain the marine vessel's 60 velocity preferably at a maximum of five knots. Alternatively, if the external object 70 is detected by the bow distance transducer 46 directly ahead of the marine vessel 60 at a distance of one hundred feet or less, the distance and velocity information is transmitted to the processor control unit 30. Subsequently, the programmable processor control unit 30 which is in electronic communication with a plurality of actuators 53 will automatically control the plurality of actuators 53 to engage the main drive 62 to reduce the velocity by 0.06 knots per foot of travel and stop the marine vessel 60 at a default distance of preferably twenty feet away from the external object 70 thereby automatically avoiding a collision. The programmable automatic docking system 10 will maintain this final position in relation to the external object 70 until an operator assumes manual control of the marine vessel 60.

Figure 3:
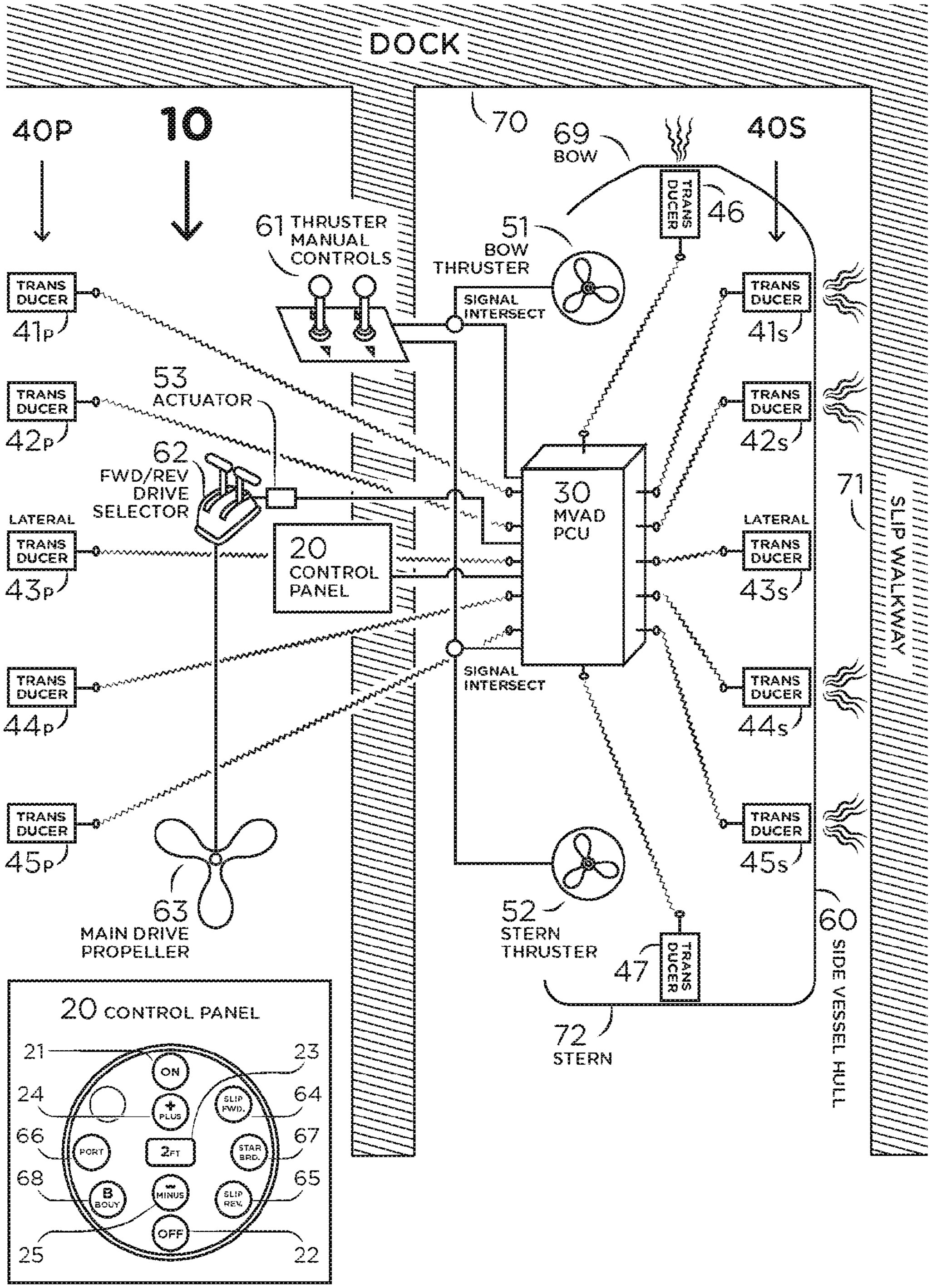
FIG. 3 is a diagrammatic perspective view of one embodiment of the programmable automatic docking system in use during docking operations into a slip.

FIG. 3 illustrates an automatic slip operation of the programmable automatic docking system 10. In this embodiment, a slip location for a marine vessel 60 may be described as follows: a dock is a secured flat structural mass bordering water which has no movement and is above the waterline. A slip walkway is attached to the dock at approximately ninety degrees to the dock extending out above the water at a distance necessary to accommodate marine vessels 60 of various lengths. There are usually two walkways 71 attached to the dock one adjacent to each side of the marine vessel and this structure provides a safe u-shaped location for a marine vessel to be stored, normally with the aid of ropes.

The slip feature of the instant invention is able to operate in both the forward or reverse direction, along with port side or starboard side. When operating in slip reverse direction, a stern distance, velocity and position transducer 47 is engaged. In this embodiment, the control panel 20 further includes a slip forward button 64 and a slip reverse button 65, wherein upon selection of either the slip forward button 64 or slip reverse button 65, the programmable processor control unit 30 maintains the marine vessel's 60 velocity at approximately two knots and defaults to a two feet side clearance between the side of the marine vessel 60 and the slip walkway 71 on the port or starboard side.

In one embodiment, the slip operation of the instant invention may occur as follows (the following example demonstrates a forward starboard selection as shown in FIG. 3):

1. As a marine vessel's bow 69 enters the slip, an operator selects the slip forward button 64 on the control panel 20.
2. Thereafter, the starboard button 67 is selected on the control panel 20.

Following the selection of the slip forward button 64 and the selection of the starboard button 67 by the operator, all further operations are maintained and controlled by the programmable automatic docking system 10, thereby eliminating further operator intervention.

In one embodiment (assuming for example that the starboard button 67 has been selected on the control panel 20), as the marine vessels bow 69 enters the slip, the set of starboard side transducers, namely the pair of distance sensing transducers 41S and 42S located on the starboard fore side of the marine vessel 60, and the pair of distance sensing transducers 44S and 45S located on the starboard aft side of the marine vessel 60 transmit a set of distance and velocity information to the programmable processor control unit 30; the set of distance and velocity information preferably relates to the distance between the starboard side of the marine vessel 60 and the slip walkway 71. The programmable processor control unit 30 will maintain the starboard side of the marine vessel 60 at a default distance setting of approximately two feet between the marine vessel 60 and the slip walkway 71 by engaging the front thruster 51 and the rear thruster 52 via electronic communication in response to the distance and velocity information detected and transmitted from the set of starboard side transducers 41S 42S 44S and 45S.

Simultaneously and operating independently, while the distance and velocity information is transmitted by the set of starboard side transducers 41S 42S 44S and 45S, the bow distance transducer 46 wirelessly transmits distance and velocity information to the programmable processor control unit 30 in relation to the bow 69 and the dock 70. Furthermore, the programmable processor control unit 30 is in electronic communication with and controls a plurality of actuators 53, which in turn control the forward/reverse drive selector 62. Therefore, the marine vessel 60 will automatically proceed to the dock 70 and maintain a maximum velocity of two knots until the bow distance transducer 46 transmits a minimum distance of three feet between the dock 70 and the bow 69 of the marine vessel 60 to the programmable processor control unit 30. Once the bow 69 of the marine vessel is three feet from the dock 70, the programmable processor control unit 30 will engage the plurality of actuators 53 controlling the forward/reverse drive selector 62 to stop the marine vessel 60 three feet from the dock 70 and maintain this final position indefinitely while the programmable automatic docking system 10 is in operation.

Figure 4:
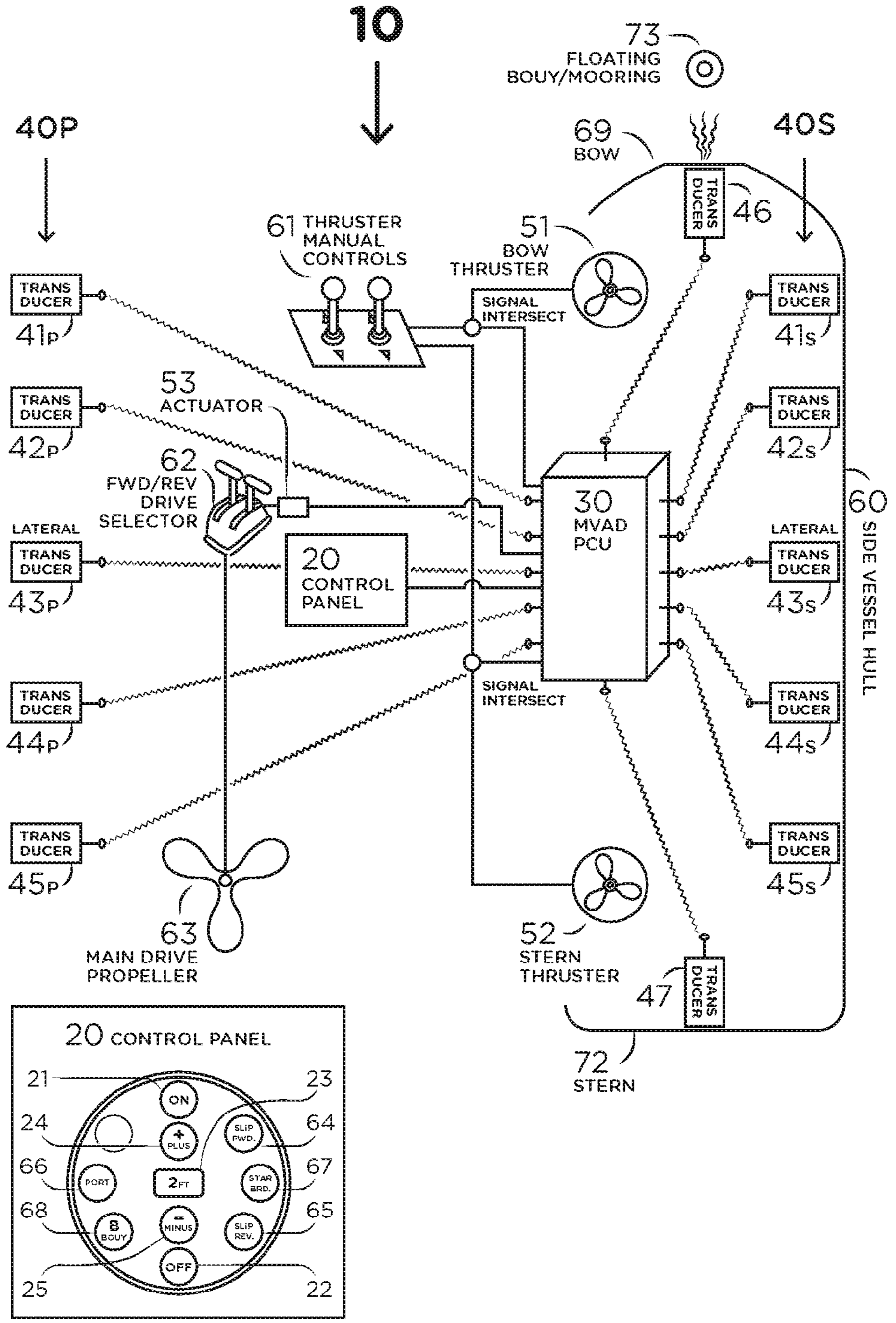
FIG. 4 is a diagrammatic perspective view of one embodiment of the programmable automatic docking system in use displaying automatic location of a floating buoy and/or mooring.

FIG. 4 illustrates a floating buoy/mooring operation of the instant invention, wherein the buoy/mooring operation includes the use of at least one bow distance, velocity and position transducer 46 for sensing the location, velocity and distance of a floating buoy/mooring 73.

In one embodiment, the floating buoy/mooring operation may occur as follows:

The bow 69 of the marine vessel 60 is brought into approximate alignment with the buoy/mooring 73 up to two hundred feet or less ahead of the bow 69 of the marine vessel 60. Upon approximate achievement of this position, a buoy button 68 is selected on control panel 20. Once the buoy button 68 is selected, the programmable processor control unit 30 wirelessly transmits to activate the bow distance, velocity and position transducer 46. Upon activation of the bow distance transducer 46, the bow distance transducer 46 detects and transmits a set of distance, position and velocity information to the programmable processor control unit 30; the set of position information includes the distance and location of the bow 69 of the marine vessel 60 with respect to the position of the buoy/mooring 73, along with the current velocity of the marine vessel 60. Additionally, the programmable processor control unit 30 remains in electronic communication and automatically engages a plurality of actuators 53 which control the forward/reverse drive selector 62; the programmable processor control unit 30 maintains a maximum speed of the marine vessel 60 of approximately two knots and controls the front thruster 51 via electronic communication in response to bow distance, velocity and position transducer real time information to maintain the direction of the bow 69 of the marine vessel 60 toward the buoy/mooring 73. Once the bow distance, velocity and position transducer 46 transmits a distance of three feet between the bow of the marine vessel 60 and the buoy/mooring 73, the programmable processor control unit 30 activates the plurality of actuators 53. This in turn, controls the forward/reverse drive selector 62 to stop the marine vessel 60 and continue to control the forward/reverse drive selector 62 and bow thruster 51 to maintain the bow 69 approximately three feet from the buoy/mooring indefinitely until the "OFF" switch 22 is selected on the control panel 20.

FIGS. 5A-5C illustrates one embodiment of the method of operation of the programmable automatic docking system 10 during docking operations. In this example, the marine vessel will be docking at a starboard external object 70, merely for illustration purposes as shown in FIG. 1.

Initially at step 100A, an operator will bring the marine vessel 60 to a stop approximately sixty feet or less adjacent to the external object 70, wherein the marine vessel 60 preferably is in a parallel orientation to the external object 70. Once the marine vessel 60 is stopped, then at step 102A, the on button 21 located on the control panel 20 is selected by an operator. Upon selection of the on button 21, at step 104A, the programmable processor control unit 30 is activated. Following activation of the programmable processor control unit 30, at step 106A a final desired distance between the starboard side of the marine vessel 60 and the external object 70 is pre-selected in order for the programmable automatic docking system 10 to cease movement of the marine vessel once the pre-selected position is reached. In one embodiment, the pre-selected distance may be input into the control panel 20 by pressing a plus button 24 to increase the distance or by pressing a minus button 25 to decrease the distance; the present distance selected will be shown on a display 23. Once the final distance is selected, at step 108A, a port button 66 or a starboard button 67 is selected on the control 20 (for this example a starboard button 67 will be selected). At step 110A, the programmable processor control unit 30 automatically transmits to activate a set of starboard side transducers 40S, which include the pair of distance sensing transducers 41S and 42S located on the starboard fore side of the marine vessel 60, and the pair of distance sensing transducers 44S and 45S located on the starboard aft side of the marine vessel 60 and a starboard side lateral position transducer 43S. Following activation of the set of starboard side transducers 40S, at step 112B the programmable processor control unit 30 activates the bow thruster 51 via electronic communication in response to the set of real-time distance and velocity information transmitted from the pair of distance sensing transducers 41S and 42S located on the starboard fore side of the marine vessel 60 to move the marine vessel 60 in a starboard direction. Simultaneously, at step 114B the programmable processor control unit 30 activates the stern thruster 52 via electronic communication in response to the set of real-time distance and velocity information transmitted from the pair of distance sensing transducers 44S and 45S located on the starboard aft side of the marine vessel 60 to move the marine vessel 60 in a starboard direction. At step 116B, the programmable processor control unit 30 automatically controls the bow thruster 51 and the stern thruster 52 to move the marine vessel 60 in a starboard direction preferably at a velocity of one foot every two seconds towards the external object 70. Once the marine vessel 60 is approximately within ten feet from the pre-selected final distance in relation to the external object 70, at step 118B the programmable processor control unit 30 communicates with the bow thruster 51 and the stern thruster 52 to reduce the velocity of the marine vessel 60; for example, if the pre-selected final distance from the external object 70 is five feet, then the marine vessel 60 will begin reducing velocity by 0.03 knots per foot of travel at fifteen feet from the external object 70. Next, at step 120B, once the pre-selected final position is reached; the programmable processor control unit 30 engages the bow thruster 51 and the stern thruster 52 to stop the marine vessel 60. Once the pre-selected final distance to the external object 70 is reached by the marine vessel 60, at step 122B, the final pre-selected position is maintained indefinitely while the programmable automatic docking system 10 is in operation.

While the starboard transducers 41S 42S 44S and 45S are in operation and transmitting real-time distance and velocity information to the programmable processor control unit 30 to move the marine vessel 60 in a starboard direction, the starboard lateral side position transducer 43S will be operating simultaneously and independent of the set of starboard transducers 41S 42S 44S and 45S to detect and transmit real-time lateral position of the marine vessel 60.

Figure 6:
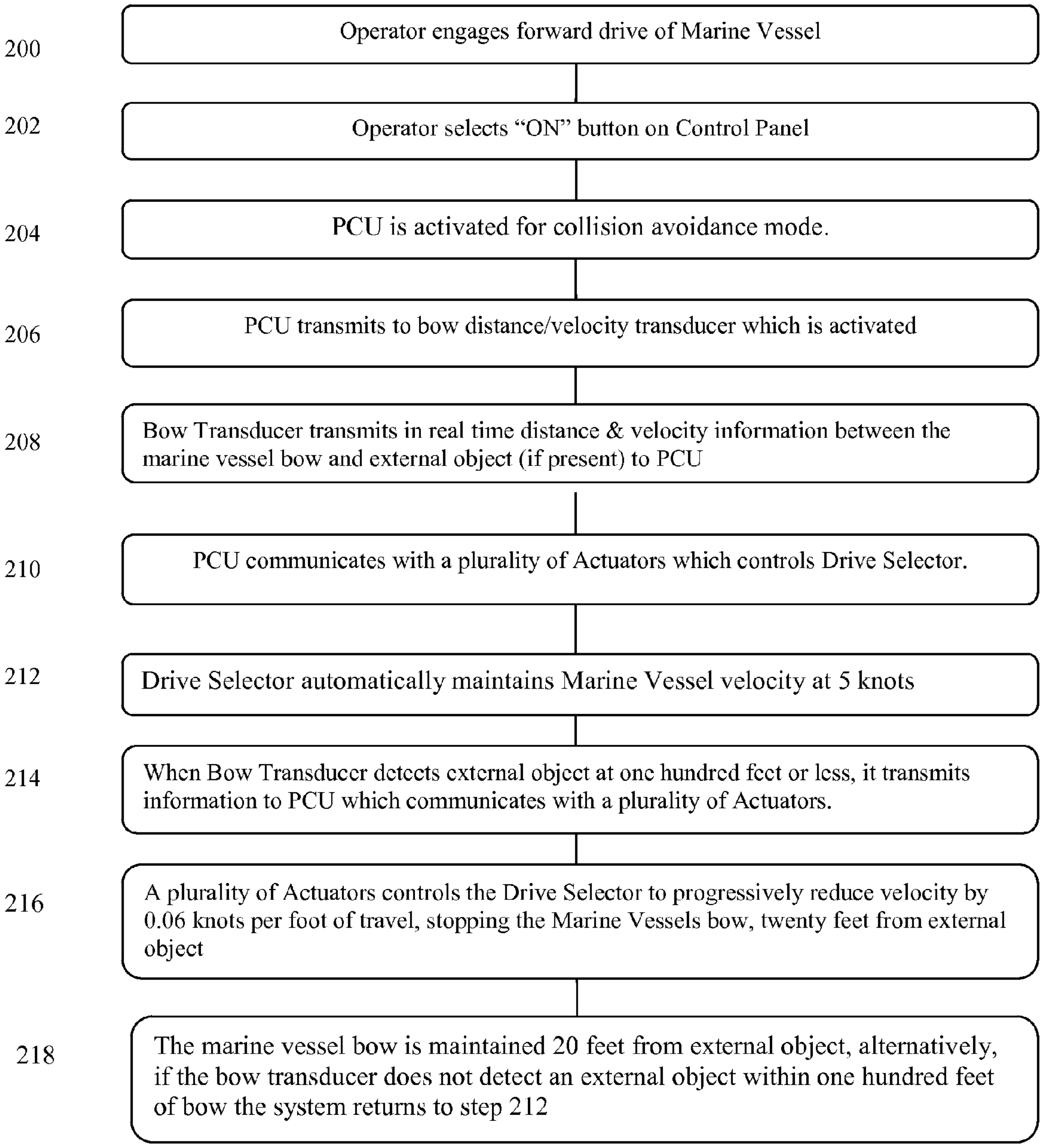
FIG. 6 is a flow diagram illustrating one embodiment of the method of operation of the programmable automatic docking system during collision avoidance operations of a marine vessel with an external object.

Therefore, at step 112C, the starboard lateral side position transducer 43S detects a lateral reference point on the external object 70 and wirelessly transmits the lateral reference point to the programmable processor control unit 30. At step 114C, the programmable processor control unit 30 memorizes the lateral reference point, from which any future lateral movement of the marine vessel 60 thereafter is processed. At step 116C, the programmable processor control unit 30 automatically compensates for any lateral movement of the marine vessel 60 by controlling the plurality of actuators 53 in response to the real-time lateral position information transmitted from the starboard lateral side position transducer 43S. At step 118C, the plurality of actuators engage the forward/reverse drive selector 62 in order to maintain the marine vessel 60 in a controlled lateral path of travel toward the precise lateral reference point memorized by the programmable processor control unit 30. At step 120C Once the marine vessel 60 reaches the final pre-selected position as described at step 118C, the starboard lateral side position transducer 43S will continue to transmit real-time lateral position information of the marine vessel 60 in relation to the memorized precise lateral reference point to the programmable processor control unit 30 and at step 122*c* will maintain the lateral position of the marine vessel 60 while the programmable automatic docking system 10 is in operation FIG. 6 illustrates one embodiment of the method of operation of the programmable automatic docking system during collision avoidance operations of a marine vessel with an external object. Initially, at step 200, the forward/reverse drive selector 62 is engaged by an operator of the marine vessel 60. At step 202, the on button 21 of the control panel 20 is selected by the operator of the marine vessel 60. Following selection of the on button 21, at step 204, the programmable processor control unit 30 of the programmable automatic docking system 10 is activated. At step 206, the programmable processor control unit 30 transmits to activate the bow distance, velocity and position transducer 46. At step 208, once the bow distance, velocity and position transducer 46 is activated, the bow distance, velocity and position transducer 46 will detect and transmit real time distance and velocity information between the bow 69 of the marine vessel 60 and an external object 70. After transmission of the initial distance information, at step 210 the forward/reverse drive selector 62 is controlled via a plurality of actuators 53 in electronic communication with the programmable processor control unit 30. At step 212 the programmable processor control unit 30 controls the drive selector 62 to maintain the marine vessel 60 preferably at a default velocity of five knots. At step 214, the bow distance, velocity and position transducer 46 continues to transmit real-time distance information and when an external object 70 is detected one hundred feet or less from the bow 69 of the marine vessel 60 the programmable processor control unit 30 communicates electronically with the plurality of actuators 53. At step 216, the plurality of actuators 53 control the forward/reverse drive selector 62 reducing velocity by 0.06 knots per foot of travel to stop the marine vessel 60 twenty feet from the external object 70. Finally, at step 218, once a distance of twenty feet between the bow 69 of the marine vessel 60 and the external object 70 is reached, the marine vessel 60 is maintained at that position indefinitely. Alternatively, if the bow distance, velocity and position transducer 46 does not detect an external object 70 within one hundred feet of the bow 69 of the marine vessel at step 218, then the system returns to step 212 to continue to transmit real-time distance information from the bow distance, velocity and position transducer 46 to the programmable processor control unit 30.

FIGS. 7A-7C illustrate a flow diagram illustrating one embodiment of the method of operation of the programmable automatic docking system during docking operations of a marine vessel upon marine vessels bow entering a slip; this flow diagram demonstrates the forward movement and starboard selection previously shown in FIG. 3.

Initially, at step 300A an operator of the system selects the slip forward button 64 on the control panel 20. At step 302A the programmable processor control unit 30 is activated to operate the slip forward mode. At step 304A the operator selects the port button 66 or the starboard button 67 on the control panel 20 (by way of illustration, starboard button 67 is selected as follows). At step 306A, the programmable processor control unit 30 automatically transmits to starboard transducers 41S 42S 44S 45S and bow distance, velocity and position transducer 46 which are simultaneously activated. At step 308B the bow distance, velocity and position transducer 46 transmits in real time distance and velocity information between the marine vessels bow 69 and the dock 70 to the programmable processor control unit 30. At step 310B, in response to real time distance and velocity information received from bow distance, velocity and position transducer 46, the programmable processor control unit 30 communicates with actuators 53 which control the forward/reverse drive control 62. At step 312B, the programmable processor control unit 30 communicates with actuators controlling forward/reverse drive control 62 which maintains marine vessel 60 velocity at a programmable processor control unit 30 default setting of two knots. At step 314B when bow distance, velocity and position transducer 46 transmits a distance of three feet between marine vessels bow 69 and dock 70 the programmable processor control unit 30 controls actuators 53 and forward/reverse drive 62 to stop marine vessel 60 at a default setting of three feet from dock 70. At step 308C starboard distance transducers 41S 42S 44S and 45S transmit real time distance information between marine vessel 60 and slip walkway 71 to the programmable processor control unit 30. At step 310C the programmable processor control unit 30 engages bow thruster 51 in response to fore side transducers 41S and 42S distance information and at step 312C simultaneously engages stern thruster 52 in response to aft side transducers 44S and 45S distance information to maintain at step 314C a default distance of two feet between marine vessel 60 and slip walkway 71. At step 316C the programmable processor control unit 30 maintains control of bow thruster 51, stern thruster 52, actuators 53 and forward/reverse drive control 62 to maintain position of marine vessel 60 indefinitely regardless of wind or water currents.

FIG. 8 illustrates a method of operation of the programmable automatic docking system 10 during the automatic location of a buoy and/or mooring for a marine vessel. Initially, at step 400, an operator of the programmable automatic docking system 10 brings the bow 69 of the marine vessel 60 into approximate alignment with a floating buoy/mooring 73 at a distance of approximately two hundred feet or less directly forward of marine vessels bow 69. Once, the marine vessel 60 is in approximate alignment, following at step 402, the operator selects the buoy button 68 on the control panel 20, which in turn activates the programmable processor control unit 30 into buoy mode. At step 404, the programmable processor control unit 30 wirelessly transmits to the bow distance, velocity and position transducer 46 which is then activated. At step 406 following activation, the bow distance, velocity and position transducer 46 detects and transmits real-time distance, location and velocity information to the programmable processor control unit 30 of the bow 69 of the marine vessel in relation to the floating buoy/mooring 73. At step 408, the programmable processor control unit 30 electronically communicates with the plurality of actuators 53 when at step 410 engages the forward/reverse drive selector 62 to maintain the forward velocity of the marine vessel 60 at a default velocity of approximately two knots. Then at step 412, the programmable processor control unit 30 communicates with and engages the bow thruster 51 in response to the real-time distance and position information detected and transmitted by the bow distance, velocity and position transducer 46 to maintain the marine vessel in a direct path of travel towards the floating buoy/mooring 73. At step 414, when the distance between the bow 69 of the marine vessel 60 and the floating buoy/mooring 73 is three feet, the marine vessel 60 is stopped by the programmable processor control unit 30 communicating with and engaging the plurality of actuators 53 which at step 416 control the forward/reverse drive selector 62 to maintain the position of the marine vessel indefinitely. At step 418, as long as the programmable automatic docking system 10 is in operation, the plurality of actuators 53 will control the forward/reverse drive selector 62 and the programmable processor control unit 30 responding to bow distance, velocity and position transducer 46 information will control the bow thruster 51 to maintain the final position of the marine vessel 60.

FIGS. 9A-9C illustrate a method of operation of a marine vessel's 60 departure from an external object 70 which is automatically controlled (in this example the marine vessel 60 is departing a starboard side external object 70).

Initially, at step 500A, an operator selects the on button 21 located on the control panel 20, which in turn activates the programmable processor control unit at step 502A. Next, at step 504A, the operator inputs a distance to move the marine vessel 60 away from the external object 70 by selecting a plus button 24 or a minus button 25 on the control panel 20; the selected distance will be shown on the display 23 on the control panel 20, wherein a distance of up to sixty feet may be selected. At step 506A the operator will select the a starboard button 67 on the control panel 20 to move the marine vessel 60 away from a starboard side external object 70 (in other embodiments to move away from a port side external object 70, the port button 66 would be selected). At step 508A, the programmable processor control unit 30 activates the set of starboard transducers 40S which includes the starboard lateral side position transducer 43S.

Following activation of the set of starboard side transducers 40S, at step 510B the programmable processor control unit 30 activates the bow thruster 51 via electronic communication in response to the set of real-time distance and velocity information transmitted from the pair of fore side distance sensing transducers 41S and 42S located on the starboard fore side of the marine vessel 60 to move the marine vessel 60 to the pre-selected distance away from the external object. Simultaneously at step 512B the programmable processor control unit 30 activates the stern thruster 52 via electronic communication in response to the pair of real-time distance and velocity information transmitted from the pair of distance sensing transducers 44S and 45S located on the starboard aft side of the marine vessel 60 to move the marine vessel 60 to the pre-selected distance away from the external object 70. The set of starboard side transducers 41S 42S 44S and 45S detect and record a set of distance and velocity information between the starboard side of the marine vessel 60 and the external object 70. At step 514B, the programmable processor control unit 30 controls the bow thruster 51 and the stern thruster 52 to move the marine vessel 60 to the pre-selected distance away from the external object preferably at a default velocity of one foot every two seconds. At step 516B, once the marine vessel 60 is approximately within ten feet from the pre-selected distance in relation to the external object 70, the programmable processor control unit 30 communicates with the bow thruster 51 and the stern thruster 52 to reduce the velocity of the marine vessel 60 by 0.03 knots per foot of travel; for example, if the pre-selected distance from the external object 70 is fifty feet, then the marine vessel 60 will reduce velocity at forty feet from the external object 70. Next, at step 518B, once the pre-selected final position is reached; the programmable processor control unit 30 engages the bow thruster 51 and the stern thruster 52 to stop the marine vessel 60. Once the pre-selected distance to the external object 70 is reached by the marine vessel 60, at step 520B, the pre-selected position in relation to the external object 70 is maintained while the programmable automatic docking system 10 is in operation.

While the set of starboard transducers 41S 42S 43S and 45S are in operation and transmitting real-time distance and velocity information to the programmable processor control unit 30 to move the marine vessel 60 to the pre-selected distance away from the external object, the starboard lateral side position transducer 43S will be operating simultaneously and independent of the set of starboard transducers 41S 42S 44S and 45S to detect and transmit real-time lateral position of the marine vessel 60. Therefore, at step 510C, once the starboard lateral side position transducer 43S is activated, the starboard lateral side position transducer 43S detects a precise lateral reference point on the external object 70, which at step 512C the programmable processor control unit 30 memorizes, and from which any future lateral movement of the marine vessel 60 thereafter is processed. At step 514C, the programmable processor control unit 30 automatically compensates for any lateral movement of the marine vessel 60 by controlling the plurality of actuators 53 in response to the real-time lateral position information transmitted from the starboard lateral side position transducer 43S. At step 516C, the plurality of actuators engage the forward/reverse drive selector 62 in order to maintain the marine vessel 60 in a controlled lateral path of travel in relation to the precise lateral reference point memorized by the programmable processor control unit 30.

Once the pre-selected distance away from the external object is reached by the marine vessel 60, at step 518C, the pre-selected position is maintained while the programmable automatic docking system 10 is in operation.

It is understood that the preceding description is given merely by way of illustration and not in limitation of the invention and that various modifications may be made thereto without departing from the spirit of the invention as claimed.

The invention claimed is:

1. A programmable automatic docking system for a marine vessel comprising:
- a set of port side transducers, wherein the set of port side transducers further comprises:
  - a pair of distance sensing transducers located on a port fore side of the marine vessel;
  - a pair of distance sensing transducers located on a port aft side of the marine vessel; and
  - a lateral port side position transducer;
- a set of starboard side transducers, wherein the set of starboard side transducers further comprises:
  - a pair of distance sensing transducers located on a starboard fore side of the marine vessel;
  - a pair of distance sensing transducers located on a starboard aft side of the marine vessel; and
  - a lateral starboard side position transducer;
- a stern thruster;
- a bow thruster;
- a forward/reverse driver selector, wherein the forward/reverse driver selector works in conjunction with the stern thruster and the bow thruster;
- a plurality of actuators, wherein the plurality of actuators control the forward/reverse drive selector;
- a programmable processor control unit, wherein the programmable processor control unit further comprises an automatic processor operating in real-time to communicate and transmit a set of distance and velocity information provided by the set of port side transducers and the set of starboard side transducers to the bow thruster and the stern thruster;
- a control panel, wherein the control panel further comprises:
  - an on button to activate the programmable automatic docking system;
  - an off button to de-activate the programmable automatic docking system;
  - a port button, wherein the port button activates the set of port side transducers to transmit a set of distance, position and velocity information of the marine vessel to the programmable processor control unit;
  - a starboard button, wherein the starboard button activates the set of port side transducers to transmit a set of distance, position and velocity information of the marine vessel to the programmable processor control unit;
  - a plus button;
  - a minus button, wherein the plus button and the minus button allow for a final pre-selected distance to be entered between the marine vessel and an external object;
  - a slip forward button;
  - a slip reverse button;
  - a buoy button;
- a bow distance, velocity and position transducer located on a bow of the marine vessel; and
- a stern distance, velocity and position transducer located on a stern of the marine vessel.

2. The programmable automatic docking system for a marine vessel of claim 1, wherein the set of port side transducers and the set of starboard side transducers provide distance, velocity and position information between five spaced locations on the port and starboard sides of the marine vessel.

3. The programmable automatic docking system for a marine vessel of claim 1, wherein each port side transducer detects and transmits a set of distance and velocity information relating to the distance between the port side of the marine vessel and an external object.

4. The programmable automatic docking system for a marine vessel of claim 1, wherein each starboard side transducer detects and transmits a set of distance and velocity information relating to the distance between the starboard side of the marine vessel and an external object.

5. The programmable automatic docking system for a marine vessel of claim 1, wherein the external object is selected from the group consisting of: a dock, another marine vessel and other similar structure.

6. The programmable automatic docking system for a marine vessel of claim 1, wherein the lateral port side position transducer establishes a lateral position from the port side of the marine vessel in relation to a precise lateral reference point on a port external object.

7. The programmable automatic docking system for a marine vessel of claim 6, wherein the precise lateral reference point is a random reference point located at ninety degrees to the side of the marine vessel on the port external object.

8. The programmable automatic docking system for a marine vessel of claim 7, wherein the lateral port side position transducer transmits any lateral movement of the marine vessel to the programmable processor control unit.

9. A method for automatically docking a marine vessel at a starboard external object utilizing the programmable automatic docking system of claim 1, the method comprising the steps of:
- bringing the marine vessel to a stop no more than sixty feet adjacent to an external object;
- selecting an on button on a control panel;
- activating a programmable processor control unit upon selection of the on button;

selecting a final pre-selected distance between the marine vessel and the external object;

selecting a starboard button on the control panel;

automatically transmitting to activate the set of starboard side transducers by the programmable processor control unit;

detecting a set of distance and velocity information by the set of starboard side transducers in relation to the starboard side of the marine vessel and the external object;

transmitting the set of distance and velocity information to the programmable processor control unit;

activating a bow thruster and a stern thruster simultaneously via electronic communication by the programmable processor control unit in response to the set of distance and velocity information previously transmitted;

automatically controlling the bow thruster and the stern thruster by the programmable processor control unit;

moving the marine vessel in a starboard direction towards the external object at a velocity of one foot every two seconds;

communicating with the bow thruster and the stern thruster by the programmable processor control unit to reduce the velocity of the marine once the marine vessel is within ten feet of the pre-selected distance from the external object;

detecting a precise lateral reference point on the external object by a starboard side lateral position transducer operating simultaneously and independent of the set of starboard transducers transmitting distance and velocity information to the programmable processor control unit;

transmitting the precise lateral reference point wirelessly to the programmable processor control unit;

memorizing the precise lateral reference point by the programmable processor control unit;

compensating automatically for any lateral movement of the marine vessel by the programmable processor control unit controlling a plurality of actuators in response to the lateral position information transmitted from the starboard lateral side position transducer;

engaging a forward/reverse drive selector by the plurality of actuators;

maintaining the marine vessel in a controlled lateral path of travel toward the precise lateral reference point;

engaging the bow thruster and stern thruster by the programmable processor control unit to stop the marine vessel once the pre-selected final distance is reached;

transmitting lateral position information of the marine vessel by the starboard lateral side position transducer to maintain the lateral position of the marine vessel after it has reached the pre-selected final distance; and maintaining the pre-selected final distance from the external object indefinitely while the programmable automatic docking system is in operation.

10. A method for automatically docking a marine vessel at a port external object utilizing the programmable automatic docking system of claim 1, the method comprising the steps of:

bringing the marine vessel to a stop no more than sixty feet adjacent to an external object;

selecting an on button on a control panel;

activating a programmable processor control unit upon selection of the on button;

selecting a final pre-selected distance between the marine vessel and the external object;

selecting a port button on the control panel;

automatically transmitting to activate the set of port side transducers by the programmable processor control unit;

detecting a set of distance and velocity information by the set of port side transducers in relation to the port side of the marine vessel and the external object;

transmitting the set of distance and velocity information to the programmable processor control unit;

activating a bow thruster and a stern thruster simultaneously via electronic communication by the programmable processor control unit in response to the set of distance and velocity information previously transmitted;

automatically controlling the bow thruster and the stern thruster by the programmable processor control unit;

moving the marine vessel in a port direction towards the external object at a velocity of one foot every two seconds;

communicating with the bow thruster and the stern thruster by the programmable processor control unit to reduce the velocity of the marine once the marine vessel is within ten feet of the pre-selected distance from the external object;

detecting a precise lateral reference point on the external object by a port side lateral position transducer operating simultaneously and independent of the set of port side transducers transmitting distance and velocity information to the programmable processor control unit;

transmitting the precise lateral reference point wirelessly to the programmable processor control unit;

memorizing the precise lateral reference point by the programmable processor control unit;

compensating automatically for any lateral movement of the marine vessel by the programmable processor control unit controlling a plurality of actuators in response to the lateral position information transmitted from the port side lateral position transducer;

engaging a forward/reverse drive selector by the plurality of actuators;

maintaining the marine vessel in a controlled lateral path of travel toward the precise lateral reference point;

engaging the bow thruster and stern thruster by the programmable processor control unit to stop the marine vessel once the pre-selected final distance is reached;

transmitting lateral position information of the marine vessel by the port side lateral position transducer to maintain the lateral position of the marine vessel after it has reached the pre-selected final distance; and maintaining the pre-selected final distance from the external object indefinitely while the programmable automatic docking system is in operation.

11. A method for collision avoidance between a marine vessel and an external object utilizing the programmable automatic docking system of claim 1, the method comprising the steps of:

engaging a forward/reverse drive selector;

selecting an on button on a control panel;

activating a programmable processor control unit upon selection of the on button;

transmitting to activate a bow distance, velocity and position transducer by the programmable processor control unit;

detecting real-time distance and velocity information between a bow of the marine vessel and the external object by the bow distance, velocity and position transducer following activation;

transmitting the real-time distance and velocity information from the bow distance, velocity and position transducer;

controlling the forward/reverse drive selector by a plurality of actuators in electronic communication with the programmable processor control unit;

maintaining a velocity of the marine vessel at five knots;

detecting the external object at no more than one hundred feet away from the marine vessel by the bow distance, velocity and position transducer;

reducing the velocity of the marine vessel to six hundredths knots per foot upon detecting of the external object at no more than one hundred feet away from the marine vessel;

detecting a distance of twenty feet between the marine vessel and the external object;

stopping the marine vessel twenty feet from the external object; and maintaining the position of the marine vessel twenty feet from the external object while the programmable automatic docking system is in operation.

12. A method for docking a marine vessel upon a bow of the marine vessel entering a slip, utilizing the programmable automatic docking system of claim 1, the method comprising the steps of:

selecting a slip forward button on a control panel;

activating a programmable processor control unit to operate in slip forward mode;

selecting a starboard button on a control panel;

automatically transmitting to activate a set of starboard side transducers and a bow distance, velocity and position transducers;

transmitting real-time distance and velocity information between the bow of the marine vessel and a dock from the bow distance, velocity and position transducer to the programmable processor control unit;

engaging the forward/reverse drive selector by a plurality of actuators in communication with the programmable processor control unit;

maintaining a velocity of two knots of the marine vessel through the forward/reverse drive selector;

transmitting real-time distance and velocity information between the set of starboard side transducers between the starboard side of the marine vessel and a slip walkway;

maintaining a distance of two feet between the starboard side of the marine vessel and the slip walkway;

engaging the bow thruster and stern thruster in response to the real-time distance and velocity information from the set of starboard side transducers to maintain a distance of two feet between the starboard side of the marine vessel and the slip walkway;

detecting a distance of three feet between the bow of the marine vessel and the dock;

stopping the bow of the marine vessel three feet from the dock; and maintaining the position of the marine vessel while the programmable automatic docking system is in operation.

13. A method for automatically location a buoy/floating mooring for a marine vessel, utilizing the programmable automatic docking system of claim 1, the method comprising the steps of:

bringing a bow of a marine vessel into alignment with the buoy/floating mooring at a distance of two hundred feet directly forward of the bow of the marine vessel;

selecting a buoy button on a control panel, which activates a programmable processor control unit;

transmitting to activate the bow distance, velocity and position transducer;

detecting real-time distance, location and velocity information in relation to the bow of the marine vessel and the buoy/floating mooring;

transmitting the real-time distance, location and velocity information of the bow of the marine vessel in relation to the buoy/floating mooring to the programmable processor control unit;

communicating electronically with the plurality of actuators by the programmable processor control unit;

engaging the forward/reverse drive selector by the plurality of actuators to maintain a forward velocity of two knots for the marine vessel;

maintaining the marine vessel in a direct path of travel towards the buoy/floating mooring by the programmable processor control unit engaging the bow thruster in response to the real-time distance, location and velocity information from the bow distance, velocity and position transducer;

stopping the bow of the marine vessel three feet from the buoy/floating mooring; and maintaining the position of the marine vessel while the programmable automatic docking system is in operation.

14. A method for automatically controlling a marine vessel's departure from a starboard external object, utilizing the programmable automatic docking system of claim 1, the method comprising the steps of:

selecting an on button on a control panel;

activating a programmable processor control unit upon selection of the on button;

inputting a pre-selected distance to move the marine vessel away from the external object;

selecting a starboard button on the control panel to move marine vessel away from a starboard external object;

activating the set of starboard side transducers by the programmable processor control unit;

activating a bow thruster and a stern thruster simultaneously via electronic communication by the programmable processor control unit in response to the set of distance and velocity information previously transmitted;

detecting a set of distance and velocity information by set of starboard side transducers in relation to the starboard side of the marine vessel and the external object;

transmitting the set of distance and velocity information to the programmable processor control unit;

moving the marine vessel away from the starboard external object at a velocity of one foot every two seconds;

communicating with the bow thruster and the stern thruster by the programmable processor control unit to reduce the velocity of the marine vessel by three hundredths knots per foot of travel once the marine vessel is within ten feet of the pre-selected distance away from external object;

detecting a precise lateral reference point on the external object by a starboard side lateral position transducer operating simultaneously and independent of the set of starboard transducers transmitting distance and velocity information to the programmable processor control unit;

transmitting a precise lateral reference point wirelessly to the programmable processor control unit;

memorizing the precise lateral reference point by the programmable processor control unit;

compensating automatically for any lateral movement of the marine vessel by the programmable processor control unit controlling a plurality of actuators in response to the lateral position information transmitted from the starboard lateral side position transducer;

engaging a forward/reverse drive selector by the plurality of actuators;

maintaining the marine vessel in a controlled lateral path of travel away from the precise lateral reference point;

engaging the bow thruster and stern thruster by the programmable processor control unit to stop the marine vessel once the pre-selected final distance is reached;

transmitting lateral position information of the marine vessel by the starboard lateral side position transducer to maintain the lateral position of the marine vessel after it has reached the pre-selected distance away from the external object; and maintaining the pre-selected distance from the external object indefinitely while the programmable automatic docking system is in operation.

* * * * *